United States Patent
Ly et al.

(10) Patent No.: US 12,052,074 B2
(45) Date of Patent: Jul. 30, 2024

(54) RESOURCE AGGREGATION FOR DYNAMIC ANTENNA PORT ADAPTATION

(71) Applicant: QUALCOMM Incorporated, San Diego, CA (US)

(72) Inventors: Hung Dinh Ly, San Diego, CA (US); Yu Zhang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 17/710,245

(22) Filed: Mar. 31, 2022

(65) Prior Publication Data

US 2023/0318669 A1  Oct. 5, 2023

(51) Int. Cl.
*H04B 7/0456* (2017.01)
*H04J 13/16* (2011.01)
*H04L 5/00* (2006.01)
*H04W 24/10* (2009.01)

(52) U.S. Cl.
CPC ............ *H04B 7/0482* (2013.01); *H04J 13/16* (2013.01); *H04L 5/0017* (2013.01); *H04L 5/0044* (2013.01); *H04W 24/10* (2013.01); *H04J 2013/165* (2013.01)

(58) Field of Classification Search
CPC ... H04J 13/16; H04J 2013/165; H04L 5/0017; H04L 5/0044; H04L 5/0057; H04W 24/10; H04B 7/0626
See application file for complete search history.

(56) References Cited

U.S. PATENT DOCUMENTS

| | | |
|---|---|---|
| 2015/0201346 A1 | 7/2015 | Wu et al. |
| 2017/0264405 A1* | 9/2017 | Gao ................. G06Q 10/10 |
| 2019/0149306 A1* | 5/2019 | Gao ................. H04L 1/0026 |
| | | 370/252 |

(Continued)

FOREIGN PATENT DOCUMENTS

| | | | |
|---|---|---|---|
| WO | WO-2019029289 A1 * | 2/2019 | ........... H04B 7/0413 |
| WO | WO-2022027985 A1 | 2/2022 | |
| WO | WO-2022036720 A1 * | 2/2022 | |

OTHER PUBLICATIONS

International Search Report and Written Opinion—PCT/US2023/012675—ISA/EPO—May 22, 2023.

*Primary Examiner* — Sophia Vlahos
(74) *Attorney, Agent, or Firm* — Holland & Hart LLP

(57) ABSTRACT

Methods, systems, and devices for wireless communications are described. A user equipment (UE) may perform an operation to obtain one or more channel state information (CSI) resources (e.g., new resources) from a set of resources indicated by a CSI report configuration. For example, the UE may aggregate or separate respective resources of the set of resources to obtain one or more CSI resources. The operation may be performed based on a first number of antenna ports associated with each resource of the set of resources and a second number of antenna ports associated with a codebook configuration. Thus, performing the operation may result in the UE forming one or more CSI resources for measuring CSI on the one or more CSI resources. The UE may transmit a CSI report based on measuring the CSI for a set of reference signals received on the one or more CSI resources.

30 Claims, 16 Drawing Sheets

(56) References Cited

U.S. PATENT DOCUMENTS

| | | | |
|---|---|---|---|
| 2019/0191444 A1* | 6/2019 | Park | H04W 72/23 |
| 2019/0273544 A1* | 9/2019 | Cha | H04L 5/0091 |
| 2019/0312614 A1* | 10/2019 | Kim | H04B 7/0689 |
| 2020/0127797 A1 | 4/2020 | Yoon et al. | |
| 2021/0058210 A1* | 2/2021 | Manolakos | H04W 52/0225 |
| 2022/0393737 A1* | 12/2022 | Zhang | H04W 24/08 |

* cited by examiner

RESOURCE AGGREGATION FOR DYNAMIC ANTENNA PORT ADAPTATION

FIELD OF TECHNOLOGY

The following relates to wireless communications, including resource aggregation for dynamic antenna port adaptation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE).

Some wireless communications systems may support network entities (e.g., base stations, base station components, network access entities, access nodes, or the like) that implement communications using a relatively large number of antenna units (e.g., compared to some other wireless communications systems) and thus consume relatively large amounts of energy. To conserve power, a network entity may dynamically adapt a number of active antenna elements, which may be referred to as dynamic antennal panel adaptation, dynamic antenna port adaptation, or the like. In some examples, however, operations at a UE being served by the network entity may be affected by antenna port adaptation.

SUMMARY

The described techniques relate to improved methods, systems, devices, and apparatuses that support resource aggregation for dynamic antenna port adaptation. For example, the described techniques provide for aggregating or separating a set of channel state information (CSI) resources to obtain a CSI resource (e.g., a new CSI resource) associated with a different number of antenna ports than respective CSI resources of the set of CSI resources. As an example, a user equipment (UE) may determine and report CSI feedback to a network entity based on receiving and measuring one or more CSI reference signals (CSI-RSs) transmitted over one or more CSI resources by the network entity. The UE may modify one or more feedback operations according to the number of antenna ports used by the network entity for measuring and reporting CSI and may aggregate or separate respective CSI resources each having a first number of antenna ports to obtain a new CSI resource having a second number of antenna ports (e.g., allowed antenna ports) for reporting CSI feedback. In such cases, the new CSI resource may be associated with a number of antenna ports that matches the number of antenna ports used by the network entity (e.g., based on dynamic antenna port adaptation). In some examples, the CSI feedback from the UE may indicate a particular CSI-RS resource (e.g., for communications between the network entity and the UE) without changing (e.g., increasing) a number of bits in a CSI-RS resource indicator bitfield of the feedback, thereby conserving overhead.

A method for wireless communication at a UE is described. The method may include receiving a control message from a network entity indicating a CSI report configuration, the CSI report configuration indicating a set of resources and one or more codebook configurations, performing an operation to obtain one or more CSI resources from the set of resources based on a first number of antenna ports associated with each resource of the set of resources and a second number of antenna ports associated with a codebook configuration of the one or more codebook configurations, where performing the operation obtains the one or more CSI resources for measuring CSI on the one or more CSI resources, measuring the CSI for a set of reference signals received on the one or more CSI resources, and transmitting a CSI report based on the measured CSI for the set of reference signals received on the one or more CSI resources.

An apparatus for wireless communication at a UE is described. The apparatus may include a processor, memory coupled with the processor, and instructions stored in the memory. The instructions may be executable by the processor to cause the apparatus to receive a control message from a network entity indicating a CSI report configuration, the CSI report configuration indicating a set of resources and one or more codebook configurations, perform an operation to obtain one or more CSI resources from the set of resources based on a first number of antenna ports associated with each resource of the set of resources and a second number of antenna ports associated with a codebook configuration of the one or more codebook configurations, where performing the operation obtains the one or more CSI resources for measuring CSI on the one or more CSI resources, measure the CSI for a set of reference signals received on the one or more CSI resources, and transmit a CSI report based on the measured CSI for the set of reference signals received on the one or more CSI resources.

Another apparatus for wireless communication at a UE is described. The apparatus may include means for receiving a control message from a network entity indicating a CSI report configuration, the CSI report configuration indicating a set of resources and one or more codebook configurations, means for performing an operation to obtain one or more CSI resources from the set of resources based on a first number of antenna ports associated with each resource of the set of resources and a second number of antenna ports associated with a codebook configuration of the one or more codebook configurations, where performing the operation obtains the one or more CSI resources for measuring CSI on the one or more CSI resources, means for measuring the CSI for a set of reference signals received on the one or more CSI resources, and means for transmitting a CSI report based on the measured CSI for the set of reference signals received on the one or more CSI resources.

A non-transitory computer-readable medium storing code for wireless communication at a UE is described. The code may include instructions executable by a processor to receive a control message from a network entity indicating a CSI report configuration, the CSI report configuration indicating a set of resources and one or more codebook configurations, perform an operation to obtain one or more CSI resources from the set of resources based on a first number of antenna ports associated with each resource of the set of resources and a second number of antenna ports associated with a codebook configuration of the one or more codebook configurations, where performing the operation obtains the one or more CSI resources for measuring CSI on the one or more CSI resources, measure the CSI for a set of reference signals received on the one or more CSI resources, and transmit a CSI report based on the measured CSI for the set of reference signals received on the one or more CSI resources.

In some examples of the method, apparatuses, and non-transitory computer-readable medium described herein, performing the operation may include operations, features, means, or instructions for aggregating two or more resources of the set of resources in accordance with an aggregation rule, where the two or more resources may be aggregated to form a CSI resource corresponding to the second number of antenna ports.

In some examples of the method, apparatuses, and non-transitory computer-readable medium described herein, aggregating the two or more resources in accordance with the aggregation rule may include operations, features, means, or instructions for aggregating the two or more resources based on respective indices of the two or more resources.

In some examples of the method, apparatuses, and non-transitory computer-readable medium described herein, aggregating the two or more resources in accordance with the aggregation rule may include operations, features, means, or instructions for aggregating the two or more resources based on respective code-division multiplexing group indices associated with each resource of the two or more resources, where the two or more resources may be aggregated across resource blocks after being aggregated across code-division multiplexing groups of a same resource block.

In some examples of the method, apparatuses, and non-transitory computer-readable medium described herein, aggregating the two or more resources in accordance with the aggregation rule may include operations, features, means, or instructions for aggregating the two or more resources based on respective port indices, where the two or more resources may be aggregated within a code-division multiplexing group and across resource blocks after being aggregated across code-division multiplexing groups of a same resource block.

In some examples of the method, apparatuses, and non-transitory computer-readable medium described herein, performing the operation may include operations, features, means, or instructions for separating at least one resource of the set of resources into two or more resources in accordance with a separation rule, where each resource of the two or more resources forms a respective CSI resource that corresponds to the second number of antenna ports.

In some examples of the method, apparatuses, and non-transitory computer-readable medium described herein, separating the at least one resource in accordance with the separation rule may include operations, features, means, or instructions for separating the at least one resource based on respective indices of the set of resources.

In some examples of the method, apparatuses, and non-transitory computer-readable medium described herein, separating the at least one resource in accordance with the separation rule may include operations, features, means, or instructions for separating the at least one resource based on respective code-division multiplexing group indices associated with each resource of the two or more resources.

In some examples of the method, apparatuses, and non-transitory computer-readable medium described herein, separating the at least one resource in accordance with the separation rule may include operations, features, means, or instructions for separating the at least one resource based on respective port indices.

Some examples of the method, apparatuses, and non-transitory computer-readable medium described herein may further include operations, features, means, or instructions for determining to perform the operation in accordance with an aggregation rule or a separation rule based on whether the second number of antenna ports may be larger or smaller than the first number of antenna ports.

Some examples of the method, apparatuses, and non-transitory computer-readable medium described herein may further include operations, features, means, or instructions for ordering a subset of resources of the set of resources based on an aggregation order, where the operation to obtain the one or more CSI resources from the set of resources may be performed after the ordering.

In some examples of the method, apparatuses, and non-transitory computer-readable medium described herein, the aggregation order includes an ascending order of resource identifiers of the subset of resources.

In some examples of the method, apparatuses, and non-transitory computer-readable medium described herein, the aggregation order includes a descending order of resource identifiers of the subset of resources.

In some examples of the method, apparatuses, and non-transitory computer-readable medium described herein, the aggregation order includes an ascending order of a resource list including the subset of resources.

In some examples of the method, apparatuses, and non-transitory computer-readable medium described herein, the aggregation order includes a descending order of a resource list including the subset of resources.

Some examples of the method, apparatuses, and non-transitory computer-readable medium described herein may further include operations, features, means, or instructions for receiving signaling indicating a set of one or more aggregation orders including the aggregation order.

Some examples of the method, apparatuses, and non-transitory computer-readable medium described herein may further include operations, features, means, or instructions for receiving a second control message indicating the aggregation order from the set of one or more aggregation orders.

In some examples of the method, apparatuses, and non-transitory computer-readable medium described herein, performing the operation may include operations, features, means, or instructions for aggregating two or more resources of the set of resources that may have a same slot offset value and a same periodicity based on the one or more codebook configurations.

In some examples of the method, apparatuses, and non-transitory computer-readable medium described herein, performing the operation may include operations, features, means, or instructions for aggregating a first resource of the set of resources with a second resource of the set of resources to form an aggregated resource corresponding to the second number of antenna ports and labelling each antenna port of the second number of antenna ports based on a total number of antenna ports included in the aggregated resource.

In some examples of the method, apparatuses, and non-transitory computer-readable medium described herein, a first set of antenna ports associated with the first resource includes a first sequence of antenna ports and a second set of antenna ports associated with the second resource includes a second sequence of antenna ports that follows the first sequence of antenna ports.

Some examples of the method, apparatuses, and non-transitory computer-readable medium described herein may further include operations, features, means, or instructions for transmitting, within the CSI report, an indication of the one or more CSI resources based on performing the operation to obtain the one or more CSI resources from the set of resources.

DETAILED DESCRIPTION

Figure 1:
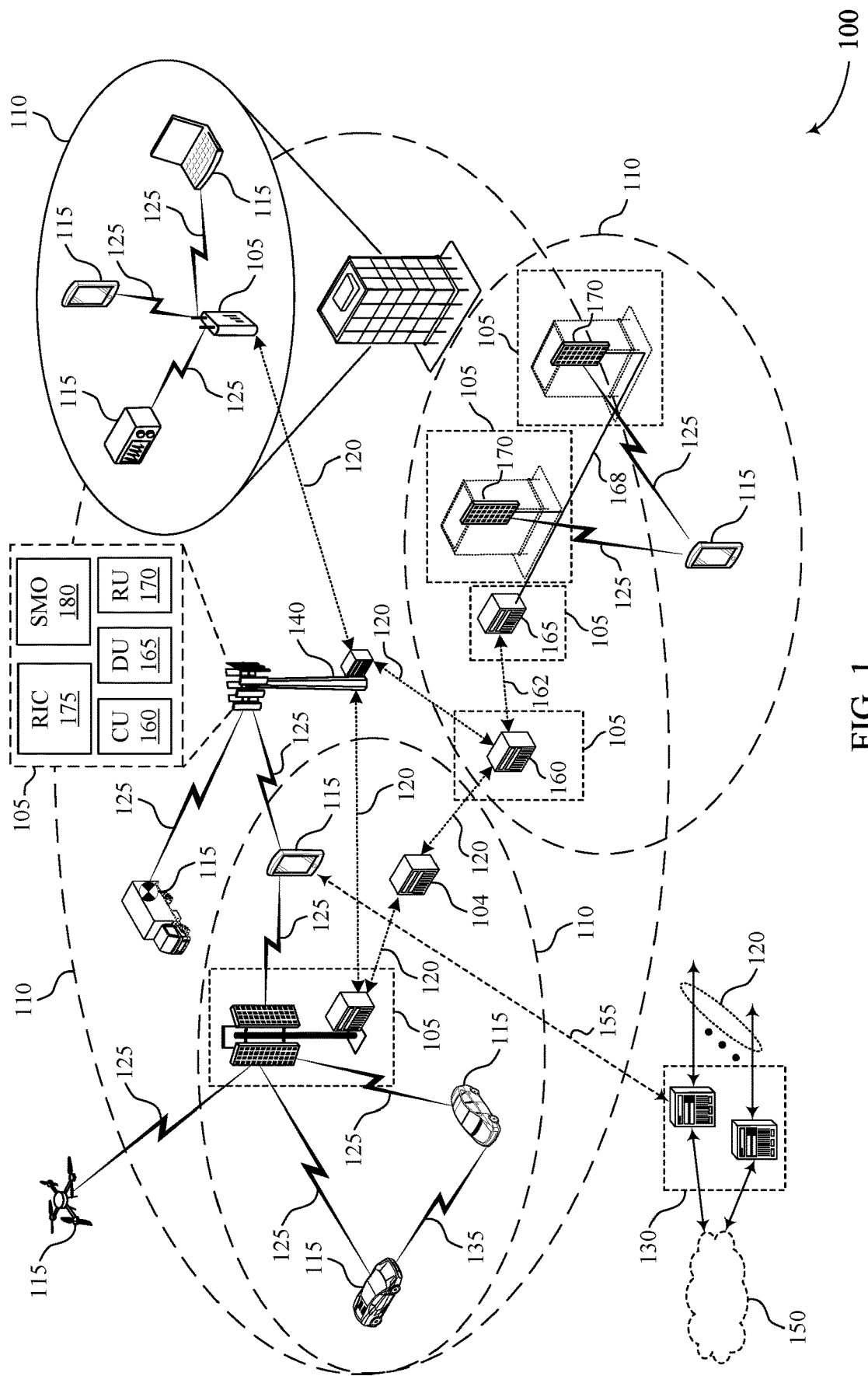
FIG. 1 illustrates an example of a wireless communications system that supports resource aggregation for dynamic antenna port adaptation in accordance with one or more aspects of the present disclosure.

Some wireless communications systems may support network entities (e.g., base stations, base station components, network access entities, access nodes, or the like) that implement communications using a relatively large number of antenna units (e.g., compared to some other wireless communications systems) and thus consume relatively large amounts of energy which may incur high operation costs. For example, network entities implementing a relatively large number of active antenna units (e.g., massive multiple input multiple output (MIMO) active antenna units) may consume relatively more energy than some other network entities. Implementing energy savings techniques may assist the efficient adoption and expansion of some wireless communications systems. To conserve power, a network entity may dynamically adapt a number of active antenna units which may be referred to as dynamic antenna port adaptation or some other similar terminology.

In some examples, a UE being served by the network entity may determine and report channel state information (CSI) feedback based on receiving and measuring one or more CSI reference signals (CSI-RSs) transmitted over one or more CSI resources by the network entity. However, operations at the UE may be affected by dynamic antenna port adaptation of the network entity, and the UE, in order to efficiently provide CSI feedback, may measure CSI associated with a number of codebook configurations e.g., indicating one or more antenna port configurations. The UE may report a set or a subset of CSI (e.g., RI, PMI, CQI, LI) associated with a set or subset of the N codebook configuration to the network entity. Based on the reported CSI, the network entity may select one or more suitable transmission parameters for communications with the UE.

As described herein, the UE may aggregate or separate resources having a first number of antenna ports for measuring CSI. For example, the UE may aggregate or resources such that a number of antenna ports associated with a new CSI resource matches the number of antenna ports used by the network entity. The UE may indicate (e.g., in the CSI feedback) a particular CSI-RS resource without increasing a number of bits in a CSI-RS resource indicator bitfield of the feedback.

In some examples, the UE may aggregate or separate a number of CSI resources each associated with a number of antenna ports (e.g., CSI-RS ports) such that a CSI resource (e.g., a new CSI resource) for measuring channel quality characteristics is obtained and corresponds to a number of antenna ports used by the network entity, and in some examples, indicated to the UE in a CSI report configuration (e.g., based on dynamic antenna port adaptation). For example, the UE may receive a CSI report configuration that indicates the network entity is dynamically adapting from using 8 CSI-RS antenna ports to 2 antenna ports. The UE may separate a resource that is associated with eight antenna ports into one or more resources each having 2 CSI-RS ports based on a number of rules or configurations and may transmit a CSI report based on the 2-port resource including a CRI for communications with the UE. Additionally, or alternatively, the network entity may modify an antenna configuration to correspond to the use of 24 CSI-RS antenna ports, and the UE may aggregate multiple CSI resources each associated with 8 CSI-RS antenna ports into one or more CSI-RS resources that are respectively associated with 24 CSI-RS antenna ports. The UE may transmit the CSI report based on the one or more 24-port CSI resources.

Aspects of the disclosure are initially described in the context of wireless communications systems. Aspects of the disclosure are further described in the context of antenna panel configuration, antenna port configurations, and resource configurations, and a process flow. Aspects of the disclosure are further illustrated by and described with reference to apparatus diagrams, system diagrams, and flowcharts that relate to resource aggregation for dynamic antenna port adaptation.

FIG. 1 illustrates an example of a wireless communications system 100 that supports resource aggregation for dynamic antenna port adaptation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support resource aggregation for dynamic antenna port adaptation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

A quasi co-location (QCL) relationship between one or more transmissions or signals may refer to a relationship between the antenna ports (and the corresponding signaling beams) of the respective transmissions. For example, one or more antenna ports may be implemented by a network entity 105 for transmitting at least one or more reference signals (such as a downlink reference signal, a synchronization signal block (SSB), or the like) and control information transmissions to a UE 115. However, the channel properties of signals sent via the different antenna ports may be interpreted (e.g., by a receiving device) to be the same (e.g., despite the signals being transmitted from different antenna ports), and the antenna ports (and the respective beams) may be described as being quasi co-located (QCLed). QCLed signals may enable the UE 115 to derive the properties of a first signal (e.g., delay spread, Doppler spread, frequency shift, average power, etc.) transmitted on a first antenna port from measurements made on a second signal transmitted via a second antenna port. Put another way, if two antenna ports are categorized as being QCLed in terms of, for example, delay spread then the UE 115 may determine the delay spread for one antenna port (e.g., based on a received reference signal, such as CSI-RS) and then apply the result to both antenna ports. Such techniques may avoid the UE 115 determining the delay spread separately for each antenna port. In some cases, two antenna ports may be said to be spatially QCLed, and the properties of a signal sent over a directional beam may be derived from the properties of a different signal over another, different directional beam. That is, QCL relationships may relate to beam information for respective directional beams used for communications of various signals.

Different types of QCL relationships may describe the relation between two different signals or antenna ports. For instance, QCL-TypeA may refer to a QCL relationship between signals including Doppler shift, Doppler spread, average delay, and delay spread. QCL-TypeB may refer to a QCL relationship including Doppler shift and Doppler spread, whereas QCL-TypeC may refer to a QCL relationship including Doppler shift and average delay. A QCL-TypeD may refer to a QCL relationship of spatial parameters, which may indicate a relation between two or more directional beams used to communicate signals. Here, the spatial parameters indicate that a first beam used to transmit a first signal may be similar (or the same) as another beam used to transmit a second, different, signal, or, that the same receive beam may be used to receive both the first and the second signal. Thus, the beam information for various beams may be derived through receiving signals from a transmitting device, where, in some cases, the QCL information or spatial information may help a receiving device efficient identify communications beams (e.g., without having to sweep through a large number of beams to identify the best beam (e.g., the beam having a highest signal quality)). In addition, QCL relationships may exist for both uplink and downlink transmissions and, in some cases, a QCL relationship may also be referred to as spatial relationship information.

In some examples, a transmission configuration indication (TCI) state configuration may include one or more parameters associated with a QCL relationship between transmitted signals. For example, a network entity 105 may configure a QCL relationship that provides a mapping between a reference signal and antenna ports of another signal (e.g., a demodulation reference signal (DMRS) antenna port for PDCCH, a DMRS antenna port for PDSCH, a CSI-RS antenna port for CSI-RS, or the like), and the TCI state may be indicated to the UE 115 by the network entity 105. In some cases, a set of TCI states may be indicated to a UE 115 via RRC signaling, where some number of TCI states (e.g., a pool of 8 TCI states from of a total of 64 TCI states may be configured via RRC) and a particular TCI state may be indicated via downlink control information (DCI) (e.g., within a CORESET). The QCL relationship associated with the TCI state (and further established through higher-layer parameters) may provide the UE 115 with the QCL relationship for respective antenna ports and reference signals transmitted by the network entity 105.

A UE 115 and a network entity 105 may communicate over a communication link 125. In some implementations, the UE 115 may perform one or more channel measurements of the communication link 125 between the UE 115 and the network entity 105 to determine a channel quality associated with the communication link 125. For instance, the network entity 105 may transmit one or more CSI-RSs to the UE 115 for the UE 115 to use in determining a channel estimate that is used to assist in link adaptation. The UE 115 may perform one or more channel measurements (e.g., CSI measurements) based on the one or more received CSI-RSs and may transmit a CSI report to the network entity 105. Based on the CSI report, the UE 115, the network entity 105, or both, may adapt transmission parameters to maintain a reliable communication link between the UE 115 and the network entity 105.

In some examples, the CSI report may include one or more parameters based on the CSI measurements. For instance, the CSI report may include one or more precoding matrix indicators (PMIs), rank indicators (RIs), layer indicators (LIs), channel quality indicators (CQIs), reference signal received power (RSRP) measurements (e.g., Layer 1-RSRPs (L1-RSRPs)), signal to interference plus noise (SINR) measurements (e.g., L1-SINRs), or the like. In some examples, the UE 115 may perform periodic CSI reporting (e.g., the network entity 105 may transmit higher layer signaling scheduling periodic CSI reports), aperiodic CSI reporting (e.g., the network entity 105 may dynamically configure a CSI report), semi-persistent CSI reporting (e.g., the network entity 105 may transmit higher layer signaling scheduling periodic CSI reports and may use dynamic signaling to trigger the periodic CSI reporting), or a combination thereof.

In some examples, the network entity 105 may configure a set of CSI measurement resources, such as CSI-RS resources, and the UE 115 may perform the one or more channel measurements over one or more of the configured set of CSI measurement resources. For example, the network entity 105 may transmit control signaling, such as a radio resource control (RRC) message, that indicates a CSI report configuration. The CSI report configuration may indicate the configured set of CSI measurement resources, as well as any other resource settings that the UE 115 may select and use to generate a CSI report based on channel and interference measurements performed in accordance with the selected resource setting. For example, the UE 115 may receive the control signaling including the CSI report configuration, which may link to one or more resource settings associated with different measurement types. The CSI report configuration may link to a setting for one or more of a non-zero power (NZP) CSI-RS resource for channel measurement (CMR), a CSI-RS resource for interference measurement (CSI-IM), or an NZP CSI-RS for interference measurement (NZP IMR), or any combination thereof. Each resource setting of the one or more resource settings to which the CSI report configuration links may be associated with multiple resources sets, but one active resource set (for example, one active resource set). The UE 115 may select one or more resources from a resource set to use for reporting the CSI. In some cases, the UE 115 may include, in the CSI report, a resource indicator (e.g., a CRI) associated with the selected one or more resources; in this manner, the network entity 105 may be informed of the correspondence between the selected resource and the reported CSI.

In some examples of the wireless communications system 100, the network entity 105, the UE 115, or both, may be configured with multiple antennas, which may be used to employ techniques such as transmit diversity, receive diversity, MIMO communications, or beamforming, or any combination thereof. For example, in MIMO operations, a device may transmit and receive multiple signals using different spatial layers based on one or more antenna ports of an antenna panel. As another example, multiple antennas may enable full duplex communications, where a device may transmit and receive simultaneously (e.g., in a same time frame); in sub-band full duplex communications, for instance, both uplink and downlink transmissions may share a same time resource (e.g., and different frequency resources). MIMO and full duplex communications may increase throughput and reduce latency in the wireless communications system 100.

The antennas of the network entity 105 and the UE 115 may be located within one or more antenna arrays or antenna panels and may be collocated. For example, the network entity 105 may include a quantity $N_g$ of antenna panels. Each antenna panel may include a number of antenna elements arranged in a configuration $(N_1, N_2)$, where $N_1$ refers to a number of antenna elements in the horizontal dimension and $N_2$ refers to a number of antenna elements in the vertical dimension.

An antenna panel may support radio frequency beamforming for a signal transmitted via one or more antenna ports. The network entity 105 and the UE 115 may thus be configured to support beamformed communications using multiple antenna ports. For example, the network entity 105 may transmit the one or more CSI-RSs using one or more CSI-RS-specific antenna ports, which may be referred to as CSI-RS ports. The quantity of CSI-RS ports supported by an antenna panel may be based on the quantity and configuration of antenna elements, and the total quantity of CSI-RS ports may further depend on the total number of antenna panels. The total quantity of CSI-RS ports may be determined by $2N_gN_1N_2$.

Additionally, the quantity and configuration of antenna panels, and the corresponding quantity of CSI-RS ports, may determine one or more parameters indicated in a CSI report by the UE 115 to the network entity 105. For example, the UE 115 may report a PMI based on the antenna configuration of the network entity 105. A PMI may indicate a codebook (e.g., a precoding matrix) preferred by the UE 115 for subsequent communications with the network entity 105. The codebook may be of a codebook type (e.g., a type 1 single panel, a type 1 multi-panel, a type 2 single panel, a type 2 port selection, a type 2 enhanced port selection), where each codebook type corresponds to a supported configuration of antenna elements. Table 1 below illustrates examples of supported configurations of antenna elements for type 2 single panel and type 2 port selection codebooks based on $N_1$ and $N_2$, and includes possible codebook oversampling factors $(O_1, O_2)$ used for PMI computation.

TABLE 1

| Number of CSI-RS antenna ports | $(N_1, N_2)$ | $(O_1, O_2)$ |
|---|---|---|
| 4 | (2, 1) | (4, 1) |
| 8 | (2, 2) | (4, 4) |
|   | (4, 1) | (4, 1) |
| 12 | (3, 2) | (4, 4) |
|   | (6, 1) | (4, 1) |
| 16 | (4, 2) | (4, 4) |
|   | (8, 1) | (4, 1) |
| 24 | (4, 3) | (4, 4) |
|   | (6, 2) | (4, 4) |
|   | (12, 1) | (4, 1) |
| 32 | (4, 4) | (4, 4) |
|   | (8, 2) | (4, 4) |
|   | (16, 1) | (4, 1) |

Table 2 illustrates examples of supported configurations for type 1 multi-panel codebooks based on $N_g$, $N_1$, and $N_2$.

TABLE 2

| Number of CSI-RS antenna ports | $(N_g, N_1, N_2)$ | $(O_1, O_2)$ |
|---|---|---|
| 8 | (2, 2, 1) | (4, 1) |
| 16 | (2, 4, 1) | (4, 1) |
|   | (4, 2, 1) | (4, 1) |
|   | (2, 2, 2) | (4, 4) |
| 32 | (2, 8, 1) | (4, 1) |
|   | (4, 4, 1) | (4, 1) |
|   | (2, 4, 2) | (4, 4) |
|   | (4, 2, 2) | (4, 4) |

Network entities 105 in the wireless communications system 100 may have any number of antenna elements and antenna panels. For example, massive MIMO operations may be supported by relatively large numbers of antenna panels. However, as the number of antenna elements increases, power consumption at a network entity 105 increases. In some examples, a network entity 105 may perform panel adaptation by turning on or off (i.e., activating or deactivating) a subset of antenna panels or subpanels, for example, to reduce such power consumption. For instance, if traffic in a cell served by the network entity 105 is relatively low, the network entity 105 may deactivate some antenna panels without negatively impacting devices operating in the cell. As another example, the network entity 105 may reduce (e.g., deactivate) the number of antenna panels or antenna elements when switching from full duplex communications to half duplex communications, in which uplink and downlink transmissions may be transmitted in different time resources (e.g., instead of a same time resource, as in full duplex communications).

As panel adaptation at a network entity 105 changes the configuration of the antenna panels and antenna elements, panel adaptation may modify the number of antenna elements used to transmit and receive signals over a wireless channel. In some cases, panel adaptation may have an impact on CSI feedback by a UE 115, as the UE 115 may not be aware of channel adaptation implemented by a network entity 105. As such, information included in the CSI feedback may not correlate to one or more antenna panels or antenna elements that may be deactivated at the network entity 105. That is, the CSI reported by the UE 115 may not provide information with enough granularity (e.g., on a per-panel or per-subpanel basis) for modifying communications parameters and link adaptation based on a number of active and non-active antenna panels at the network entity 105. The techniques described herein therefore support a UE 115 performing CSI procedures based on a quantity of active antenna panels and/or subpanels at the network entity 105. The network entity 105 may configure CSI-RS resources such that respective CSI-RS resources map to one or more antenna panels at the network entity 105.

The network entity 105 may transmit, and the UE 115 may receive, control signaling indicating a CSI report configuration. In some examples, the UE 115 may determine and report CSI feedback to the network entity 105 based on receiving and measuring one or more CSI-RSs transmitted over one or more CSI resources by the network entity 105. As such, the UE 115 may provide feedback for the number of antenna ports used by the network entity 105 for measuring and reporting CSI according to the CSI report configuration. Toreport CSI feedback that matches the number of antenna ports used by the network entity, the UE 115 may aggregate or separate CSI resources according to one or more codebook configurations received in the CSI report configuration. Here, the UE 115 may form one or more (new) CSI resources through the aggregation or separation of CSI resources of a set of CSI resources. Additionally, to implement such resource aggregation/separation without increasing overhead, the UE 115 may transmit a feedback report that indicates a particular CSI-RS resource without changing (e.g., increasing) a number of bits in a CSI-RS resource indicator bitfield of the feedback.

For example, the UE 115 may receive a control message from the network entity 105 indicating a CSI report configuration. In some examples, the CSI report configuration may indicate or may include an indication of a set of resources and one or more codebook configurations (e.g., of the network entity 105). The UE 115 may perform an operation to obtain one or more new resources from the set of resources based on a first number of antenna ports associated with each resource of the set of resources and a second number of antenna ports associated with a codebook configuration of the one or more codebook configurations. In some examples, performing the operation forms one or more CSI resources for measuring CSI on the one or more CSI resources. The UE 115 may transmit a CSI report based on the measured CSI for the set of reference signals received on the one or more CSI resources. In some examples, the CSI report may include an indication of the one or more CSI resources based on performing the operation to obtain the one or more new resources from the set of resources. As such, the UE 115 may aggregate or separate CSI-RS resources to match the antenna ports used by a network entity 105 and, in some examples, may indicate the new resource to the network entity 105 so that the network entity 105 may interpret the CRI based on the aggregation or separation.

Figure 2:
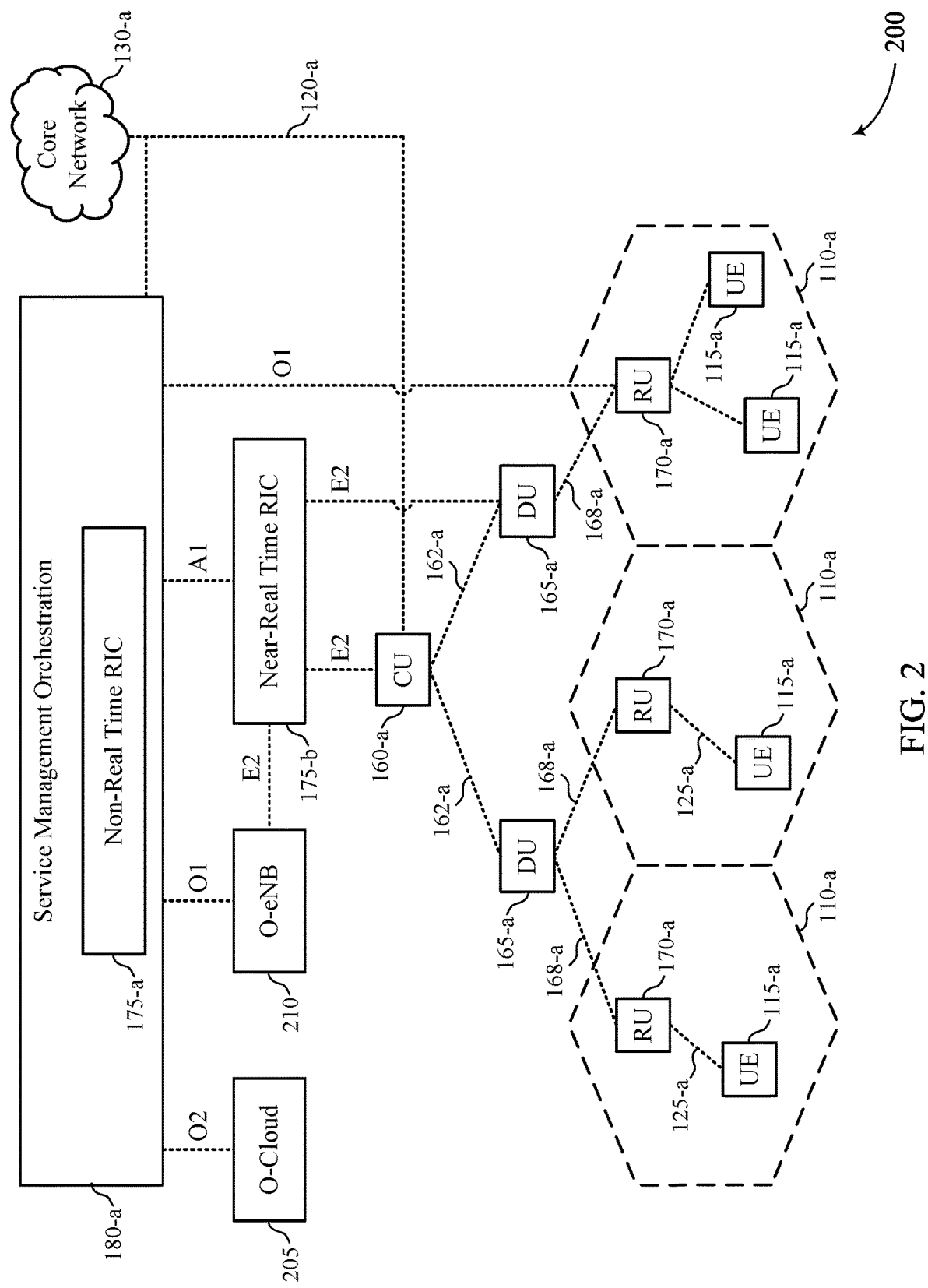
FIG. 2 illustrates an example of a network architecture that supports resource aggregation for dynamic antenna port adaptation in accordance with one or more aspects of the present disclosure.

FIG. 2 illustrates an example of a network architecture 200 (e.g., a disaggregated base station architecture, a disaggregated RAN architecture) that supports resource aggregation for dynamic antenna port adaptation in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may communicate with respective UEs 115-*a* via one or more communication links 125-*a* in a same coverage area 110-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

In some examples, a CU 160-*a* may communicate one or more RRC signals to a UE 115-*a* via one or more network entities 105 (e.g., a DU 165-*a*, an RU 170-*a*) which may support resource aggregation for dynamic antenna port adaptation. For example, a CU 160-*a* may communicate RRC signaling including an indication of a CSI report configuration as described herein. The CSI report configuration may indicate the configured set of CSI measurement resources, as well as other resource settings that a UE 115-*a* may select and use to generate a CSI report based on channel and interference measurements performed in accordance with the selected resource setting. For example, the UE 115-*a* may receive the control signaling including the CSI report configuration, which may link to one or more resource settings associated with different measurement types. The CSI report configuration may link to a setting for one or more of an NZP CMR, a CSI-IM, or an NZP IMR, or any combination thereof. Each resource setting of the one or more resource settings to which the CSI report configuration links may be associated with multiple resources sets, but one active resource set (for example, one active resource set). The UE 115-*a* may select one or more resources from a resource set to use for reporting the CSI. In some cases, the UE 115-*a* may include, in the CSI report, a resource indicator (e.g., a CRI) associated with the selected one or more resources; in this manner, one or more of the network entities 105 may be informed of the correspondence between the selected resource and the reported CSI.

A UE 115-*a* may use the CSI report configuration (e.g., from the CU 160-*a*) to determine one or more new CSI-RS resources for reporting CSI. For example, the UE 115-*a* may perform on operation for aggregating or separating a set of CSI resources to obtain a CSI resource (e.g., a new CSI resource) associated with a different number of antenna ports than respective CSI resources of the set of CSI resources. As an example, a UE 115-*a* may determine and report CSI feedback based on receiving and measuring one or more CSI-RSs (e.g., output by a DU 165-*a*, transmitted by an RU 170-*a*) over one or more CSI resources. The UE 115-*a* may provide feedback for the number of antenna ports (e.g., associated with a number of active antenna elements at an RU 170-*a*) for measuring and reporting CSI and the UE 115-*a* may aggregate or separate respective CSI resources each having a first number of antenna ports to obtain a new CSI resource having a second number of antenna ports (e.g., allowed antenna ports) for reporting CSI feedback according to one or more codebook configurations indicated in the CSI report configuration. In such cases, the new CSI resource may be associated with a number of antenna ports that matches the number of antenna ports for transmitting CSI-RS (e.g., based on dynamic antenna port adaptation). In some examples, the CSI feedback from the UE 115-*a* may indicate a particular CSI-RS resource (e.g., for communications between the network entity 105 and the UE 115-*a*) without changing (e.g., increasing) a number of bits in a CSI-RS resource indicator bitfield of the feedback, thereby conserving overhead.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for forward error correction (FEC) encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-a (e.g., reconfiguration via O1) or via generation of RAN management policies (e.g., A1 policies).

Figure 3:
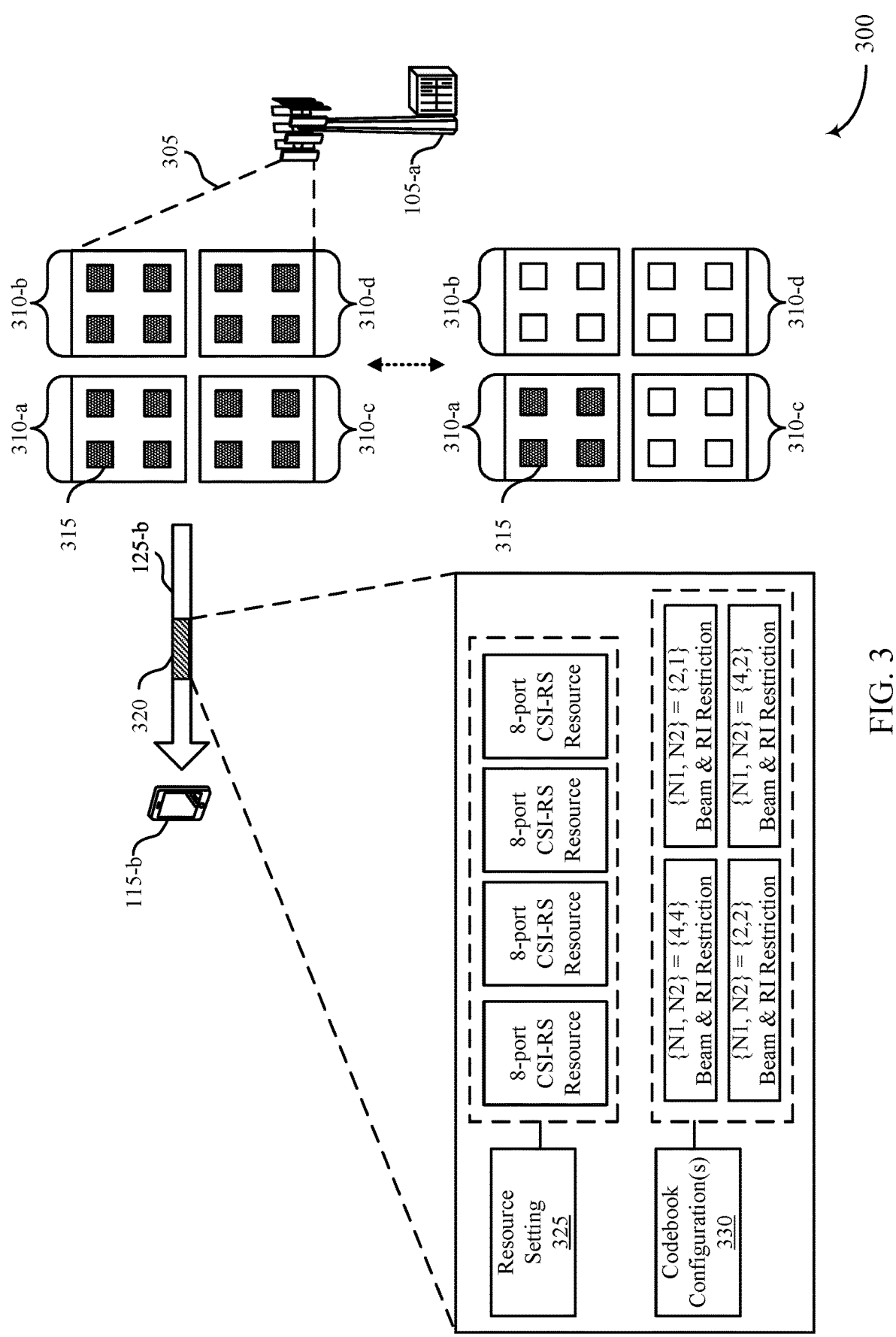
FIG. 3 illustrates an example of a wireless communications system that supports resource aggregation for dynamic antenna port adaptation in accordance with one or more aspects of the present disclosure.

FIG. 3 illustrates an example of a wireless communications system 300 that supports resource aggregation for dynamic antenna port adaptation in accordance with one or more aspects of the present disclosure. In some examples, wireless communications system 300 may implement aspects of wireless communications system 100 and/or network architecture 200. For instance, wireless communications system 300 includes a UE 115-b, and a network entity 105-a, which may be examples of the corresponding devices described with reference to FIGS. 1 & 2. Additionally, or alternatively, the UE 115-b may be an example of a CPE, a relay node, a repeater, a router, an IAB node, or the like. Similarly, the network entity 105-a may be an example of a backhaul node, an IAB node, or the like. Thus, although aspects of the present disclosure are described with reference to a UE 115 and network entities 105, it is understood that the described techniques may be performed by a wireless device different from a UE 115 and network entities 105.

The UE 115-b may communicate with the network entity 105-a via a communication link 125-b. The network entity 105-a and the UE 115-b may be configured with multiple antennas located within one or more antenna arrays or antenna panels. For example, antenna panels may be collocated within a wireless device (e.g., a network entity 105-a or the UE 115-b).

As illustrated in FIG. 3, the network entity 105-a includes multiple antenna elements 315 arranged in an antenna panel configuration 305 that includes, for example, four antenna panels 310 (e.g., antenna panels 310-a, 310-b, 310-c and 310-d). Each antenna panel 310-a, 310-b, 310-c and 310-d may include multiple antenna elements 315. The network entity 105-a may transmit and receive downlink and uplink transmissions using the antenna panels 310, for example, via full duplex and/or MIMO communications. For instance, the UE 115-b and the network entity 105-a may utilize subband full duplex (SBFD) communications, where uplink and downlink communications may be transmitted in a same time resource. In some cases, greater data throughput may be achieved by operating SBFD on several antenna panels 310, e.g., such that some antenna elements 315 may be configured for transmitting and receiving uplink transmissions and other antenna elements 315 may be configured for transmitting and receiving downlink transmissions. Additionally, in MIMO communications, the multiple antenna elements 315 may support transmission and reception of different data streams. As an example, the network entity 105-a may transmit and receive multiple signals using different spatial layers based on one or more antenna ports associated with antenna elements 315. In some cases, each data stream may be referred to as a MIMO layer, where the number of MIMO layers for MIMO communications may be based on the number of transmit and receive antennas.

In the wireless communications system 300, the UE 115-b may perform channel and interference measurements to maintain or improve the communication links 125 with the respective network entities 105. For instance, the UE 115-b may receive a CSI report configuration 320 from the network entity 105-a. The CSI report configuration 320 may include information for the UE 115-a to use in determining and reporting CSI, such as CSI report timing, quantities to measure, codebooks to use, and/or TCI state and antenna panel configuration information (e.g., associated with the corresponding network entity 105), among other examples. The network entity 105-a may transmit one or more CSI-RSs over one or more CSI-RS resources (e.g., CMRs) to the UE 115-b via the communication link 125-a and in accordance with the CSI report configuration 320. The UE 115-b may perform measurements based on the received CSI-RSs and generate CSI based on the measurements. The UE 115-b may transmit a CSI report including CSI feedback to the network entity 105-a, which may allow the network entity 105-a to perform link adaptation procedures and optimize communications parameters for the communication link 125-b.

While having multiple antenna elements 315 and multiple antenna panels 310 may enable the network entity 105-a to utilize various communications schemes, such as SBFD, MIMO, or other examples, the power consumed by the network entity 105-a may increase as the quantity of antenna panels 310 and antenna elements 315 increases. For instance, each antenna element 315 may be linked with an RF chain that may include power amplifiers (PAs), low noise amplifiers (LNAs), and other RF components. Each component, and each RF chain, may consume relatively large amounts of power. Accordingly, in some cases, and as described herein, the network entity 105-a may dynamically turn off (e.g., deactivate, power down) one or more antenna panels 310 and/or one or more subpanels of one or more of the antenna panels 310 to conserve power and increase energy efficiency.

For instance, when there is relatively little traffic/activity in a cell served by the network entity 105-a, the network entity 105-a may switch from full duplex communications to half duplex communications, and the network entity 105-a may operate with fewer overall antenna panels 310 when using half duplex communications. In other examples, the network entity 105-a may reduce a number of MIMO layers used, which may enable the network entity 105-a to deactivate some antenna panels 310. However, deactivating antenna panels 310 may impact CSI procedures at the UE 115-b. For instance, a number of CSI-RS ports associated with a CSI-RS may be mapped to physical antennas of the antenna panels 310 and antenna elements 315 at the network entity 105-a. Further, codebooks used by the network entity 105-a and the UE 115-b may be based on the number of CSI-RS ports. Thus, changing the configuration of the antenna panels 310 may change the number of available CSI-RS ports and the associated codebooks, among other impacts.

The antenna panel configuration 305 may be associated with a number of CSI-RS ports determined by $2N_gN_1N_2$. With all antenna panels 310 active, the antenna panel configuration 305 may be associated with, for example, 32 CSI-RS ports. The network entity 105-a, in some cases, may determine to deactivate antenna panels 310-b, 310-c, and 310-d, and the antenna panel configuration 305, having one active antenna panel 310-a, may be associated with 8 CSI-RS ports. If the UE 115-b is unaware that some antenna panels 310 are turned off, the UE 115-b may be unaware of the change in CSI-RS ports. In other examples, the network entity 105-a may activate one or more of the antenna panels 310-a, 310-b, 310-c, and 310-d (e.g., to adapt to an increase in traffic, an influx of a number of additional UEs 115, or the like). In any case, the UE 115-b may need to adapt CSI feedback accordingly. Panel adaptation at a network entity 105 may therefore impact the usefulness of CSI feedback provided by the UE 115-b and improved techniques may be desirable.

The methods and techniques described herein may enable the UE 115-b to perform CSI procedures based on a quantity of active antenna panels and/or subpanels at a network entity 105. The network entity 105-a, for instance, may configure a set of CSI-RS resources such that respective CSI-RS resources map to one or more antenna panels 310. The network entity 105-a may transmit a CSI report configuration 320 (e.g., CSI-reportConfig) to UE 115-b which may include an indication of a mapping between CSI-RS resources (e.g., or CSI-RS ports) and one or more of the antenna panels 310. That is, the network entity 105-a may transmit the CSI report configuration 320 identifying a set of CSI resources that are each associated with a number of antenna ports. This configuration may facilitate transitions during panel adaption, as the UE 115-b may perform CSI procedures for different antenna panel configurations.

For example, the CSI report configuration 320 may indicate that the network entity 105-a has switched from using a first number of antenna panels (e.g., associated with a first number of antenna ports) to using a second number of antenna panels (e.g., associated with a second number of antenna ports). The CSI report configuration 320 may include a resource setting 325 and one or more codebook configurations 330. The resource setting 325 may indicate a set of CSI-RS resources, where in the example of FIG. 3 the set of CSI-RS resources include four 8-port CSI-RS resources. The codebook configuration(s) 330 may each correspond to an antenna configurations (e.g., a reduced or full antenna configuration depending on the dynamic antenna adaptation) and may include an indication of a number of antenna elements in a horizontal dimension, N1 and a number of antenna elements in a vertical dimension, N2. Each codebook configuration may indicate one or more restriction rules for the respective antenna configurations (e.g., beam and RI restriction).

A CSI-RS resource including a larger number CSI-RS ports may be formed to accommodate the switch by aggregating resources containing a smaller number of CSI-RS ports. Similarly, a CSI-RS resource including a smaller number CSI-RS ports may be formed to accommodate the switch by separating resources containing a smaller/larger number of CSI-RS ports.

For example, a CSI-RS resource set may include four resources each containing 8 CSI-RS ports. The CSI-RS resources may be aggregated to form a new resource containing an aggregated number of CSI-RS ports (e.g., {16, 24, 32}). Similarly, a CSI-RS resource set may include a single resource each containing 32 CSI-RS ports. The CSI-RS resources may be separated to form a new resource containing an smaller number of CSI-RS ports (e.g., {2, 4, 8, 12, 16, 24}).

The CSI report configuration 320 may include one or more of an NZP CSI-RS resource configuration for channel measurement, a CSI-RS resource configuration for interference management, an NZP CSI-RS resource configuration for interference management, a codebook configuration, and a report configuration type (e.g., periodic, semi-persistent, aperiodic). The codebook configuration may be a type I single-panel configuration, a type I multi-panel configuration, type II single-panel configuration, a type II port selection configuration, a type II enhanced port selection configuration, among other examples. The codebook configuration may indicate a number of ports used by the network entity 105-a and may be dynamically updated as the network entity 105-a implements dynamic antenna adaptation.

The UE 115-b may receive the CSI report configuration 320 as well as one or more CSI-RSs and may aggregate or separate one or more resources of the set of CSI-RS resources and may perform channel estimation measurements based on the new resource, which may include multiple hypotheses for various CSI-RS port configurations. Each hypothesis may correspond to a single antenna panel 310 or one or more subsets of antenna panels 310. In the case of subsets of antenna panels 310, the UE 115-b may perform a hypothesis for each possible combination of panels, e.g., based on a hypothesis group. For instance, the CSI report configuration 320 may indicate that the UE 115-b is to perform a dual panel hypothesis, where the UE 115-b performs a hypothesis for each set of two antenna panels 310. For four antenna panels 310, as illustrated in antenna panel configuration 305, the UE 115-b may perform multiple hypotheses. In one example, The UE 115-b may perform a single hypothesis for a 32-port CSI-RS resource, four hypotheses for a 24-port CSI-RS resource, six hypotheses for a 16-port CSI-RS resource, four hypotheses for an 8-port CSI-RS resource, eight hypotheses for a 4-port CSI-RS resource (e.g., assuming hypothesized resources do not overlap), and one or more hypotheses for a 12-port CSI-RS resource.

In some examples, the UE 115-b may derive CSI feedback based on a resource of the set and may report a 2-bit CRI in CSI report. To cover all possible resource hypotheses, the number of bits to indicate CRI may be larger than 2 (e.g., 5 bits to cover the hypotheses described herein) and the number of bits may vary depending on antenna configurations indicated in the CSI report configuration 320. As such, overhead may be increased. To conserve overhead, the described techniques may enable the CRI bitfield in a CSI feedback report to be invariant regardless of the number of CSI-RS ports used for communications by the network entity.

Figure 4:
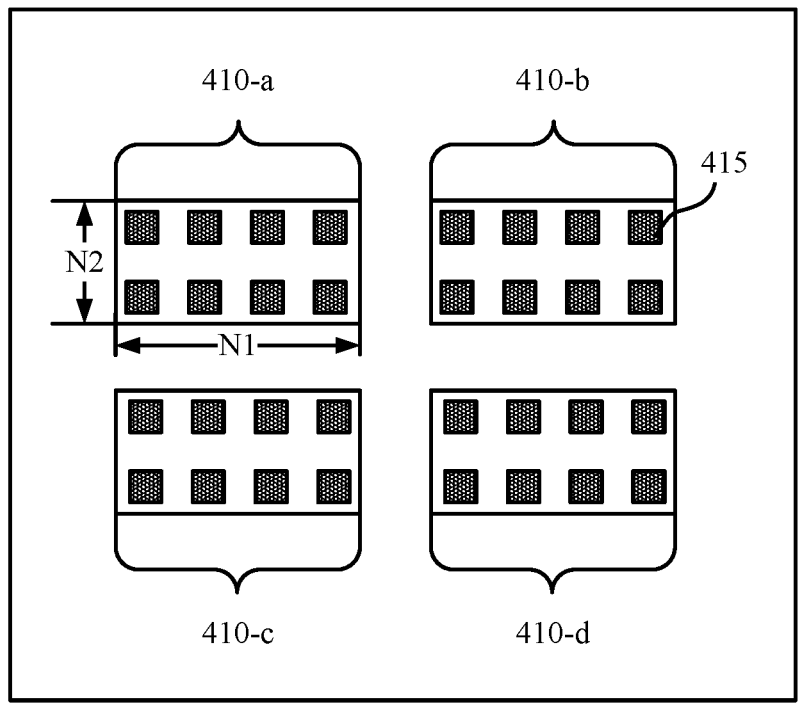
FIG. 4 illustrates an example of an antenna panel configuration that supports resource aggregation for dynamic antenna port adaptation in accordance with one or more aspects of the present disclosure.

FIG. 4 illustrates an example of an antenna panel configuration 400 that supports resource aggregation for dynamic antenna port adaptation in accordance with one or more aspects of the present disclosure. In some examples, the antenna panel configuration 400 may implement aspects of wireless communications system 100 or 300, or network architecture 200. For example, the antenna panel configuration 400 may be an example of an antenna array implemented at a wireless device, such as a UE 115, a network entity 105, a CPE, a repeater, a router, or other device. The antenna panel configuration 400 may include a set of antenna panels 410, where each antenna panel 410 includes a number of antenna elements 415 in a horizontal dimension N1 and a vertical dimension N2. It is noted that the dimensions of the antenna panel configuration 400 are provided for illustrative purposes and should not be considered limiting, as antenna arrays having different sizes, configurations, or dimensions are also possible.

The antenna panel configuration 400 may be associated with a number of CSI-RS ports based on the quantity and configuration of the antenna panels 410 and the antenna elements 415. In accordance with techniques described herein, a device, such as a network entity (e.g., a network entity with multiple collocated antenna panels 410), may configure a set of CSI-RS resources for transmitting, to a UE (e.g., UE 115), CSI-RSs using the antenna panel configuration 400. The network entity may indicate (e.g., via control signaling, such as RRC signaling, via a CSI report configuration, among other examples) a CSI report configuration that includes an indication of the set of CSI-RS resources and a codebook configuration (e.g., including an indication of number of ports used by the network entity). For example, the codebook configuration may include a specific supported configuration of the antenna elements (N1, N2) and a number of panels, Ng for each codebook type and a corresponding number of CSI-RS antenna ports per resource may equal 2*Ng*N1*N2.

In some examples, the CSI report configuration may be configured per BWP of the network entity. The number of configured CSI-RS resources in the set of CSI-RS resources may correspond to the number of active antenna panels 410 and consequently, the number of antenna ports used by the network entity. For example, a set of CSI-RS resources may include a number of resources, Ks.

The network entity may transmit the CSI report configuration to the UE and may subsequently transmit one or more CSI-RSs on the configured CSI-RS resources. The UE may perform channel measurements based on receiving the one or more CSI-RSs, and may generate CSI feedback based on the channel measurements and in accordance with the CSI report configuration. The UE may receive a CSI-RS and generate CSI feedback for the associated antenna panel 410.

In some cases, a number of CSI-RS ports per antenna panel 410 may be the same or may be different. For instance, if the antenna panels 410-*a*, 410-*b*, 410-*c*, and 410-*d* have the same number of antenna elements 415, there may be a same number of CSI-RS ports across the respective CSI-RS resources for each panel. In other examples, if the antenna panels 410-*a*, 410-*b*, 410-*c*, and 410-*d* have a different number of antenna elements, the respective CSI-RS resources may have different number of CSI-RS ports.

For example, each of the Ks resources may have a same number of CSI-RS ports, where when Ks=1, each resource may include up to 32 CSI-RS ports; when Ks=2, each resource may include up to 16 CSI-RS ports; and when 2<Ks<8, each resource may include up to 8 CSI-RS ports and a P-port resource may include ports labeled from 3000 to 3000+(P−1). Thus, when a network entity uses a subset of available antenna elements and because the number of configured CSI-RS resources in the set of CSI-RS resources may correspond to the number of active antenna panels 410, a UE may not accurately provide CSI-RS feedback if measuring channels according to a full antenna configuration. As such, dynamic antenna port adaptation may affect CSI feedback reporting at the UE. As described herein, the UE may provide feedback for the number of antenna ports used by the network entity for measuring and reporting CSI by aggregating or separating one or more resources of the set of CSI-RS resources according to one or more codebook configurations provided by the CSI report configuration. In particular, the UE may perform an operation to obtain one or more CSI resources (e.g., new resources) from a set of resources indicated by a CSI report configuration. Here, the UE may aggregate or separate respective resources of the set of resources to obtain the one or more CSI resources for use in performing channel characteristic measurements. The operation may be performed based on a first number of CSI-RS ports associated with each resource of the set of resources and a second number of CSI-RS ports associated with a codebook configuration. Thus, performing the operation may result in the UE forming one or more CSI resources for measuring channel characteristics for reference signals on the one or more CSI resources. The UE may transmit a CSI report based on the measured CSI for the set of reference signals received on the one or more CSI resources (e.g., created using the aggregation operation or separation operation).

Figure 5A:
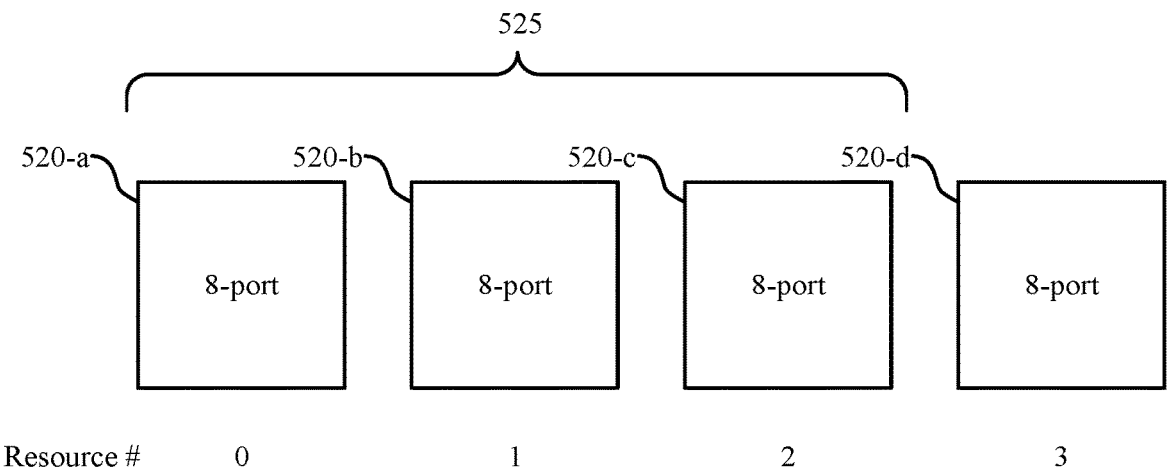
FIGS. 5A and 5B illustrate examples of resource configurations that each support resource aggregation for dynamic antenna port adaptation in accordance with one or more aspects of the present disclosure.

FIG. 5A illustrates an example of a resource configuration 501 that supports resource aggregation for dynamic antenna port adaptation in accordance with one or more aspects of the present disclosure. The resource configuration 501 may implement one or more aspects of wireless communications systems 100, 300, and/or network architecture 200. The resource configuration 501 may illustrate a possible CSI resource configuration for reporting CSI feedback to a network entity implementing massive MIMO communications. The resource configuration may include four resources 520-*a*, 520-*b*, 520-*c*, and 520-*d* that may each be associated with a number of antenna ports (e.g., eight CSI-RS antenna ports).

As described herein, a UE may perform an operation to obtain one or more CSI resources (e.g., new resources) from a set of resources indicated by a CSI report configuration. For example, the UE may aggregate or separate respective resources of the set of resources to obtain one or more CSI resources. The operation may be performed based on a first number of antenna ports associated with each resource of the set of resources and a second number of (allowed) antenna ports associated with a codebook configuration. Thus, performing the operation may result in the UE obtaining one or more CSI resources for measuring channel characteristics for CSI-RSs on the one or more CSI resources.

As an illustrative example of aggregating (e.g., combining) two or more resources, the resources 520 may be aggregated at a resource level following a resource aggregation order. For example, the resources 520-*a*, 520-*b*, and 520-*c* may each include 8 ports and may be aggregated into a new resource 525 including 24 ports. In some other examples, the resources 520-*a*, 520-*b*, and 520-*c* may be aggregated based on a respective index (e.g., resource number) of the resource 520 such that resources 520-*a* and 520-*b* may be aggregated to form a 16 port resource based on the respective indexes being 0 and 1.

In general, a new resource (e.g., aggregated resource) may include an allowed number of CSI-RS ports (e.g., {2, 4, 8, 12, 16, 24, 32}) for communications in a wireless communications system. For example, if there are eight 2-port CSI-RS resources available in the resource set (e.g., for a total of 16 available ports), aggregation over {3, 5, 7} resources may not be compatible with some wireless communications systems because the new resource (e.g., aggregated resource) may include {6, 10, 14} ports respectively, which may not be supported by some wireless communications. That is aggregating three 2-port resources to form a 6-port resource; aggregating five 2-port resources to form a 10-port resource; or aggregating seven 2-ports resources to form a 14-port resource may not be supported in some examples.

A UE may determine to aggregate one or more resources according to the respective index of the resources based on whether a number of CSI ports used by the network entity (e.g., indicated in the CSI report configuration) is larger than the number of CSI ports associated with each resource 520.

In some example, one or more resources 520 may be separated at a resource level following a resource aggregation order. For example, a CSI resource may include resources 520-*a*, 520-*b*, 520-*c*, and 520-*d* and may be separated into a new resource 520 including 24 ports. That is, in some examples, resource 520-*d* may be separated from resources 520-*a*, 520-*b*, and 520-*c*. In some other examples, the resource 520-*d* may be separated based on the respective indexes (e.g., resource number) of the resources 520, such that resource 520-*c* may be further separated from resources 520-*a* and 520-*b* to form a 16-port resource based on the index of resources 520-*d* and 520-*c* being higher than those of resources 520-*a* and 520-*b*.

Figure 5B:
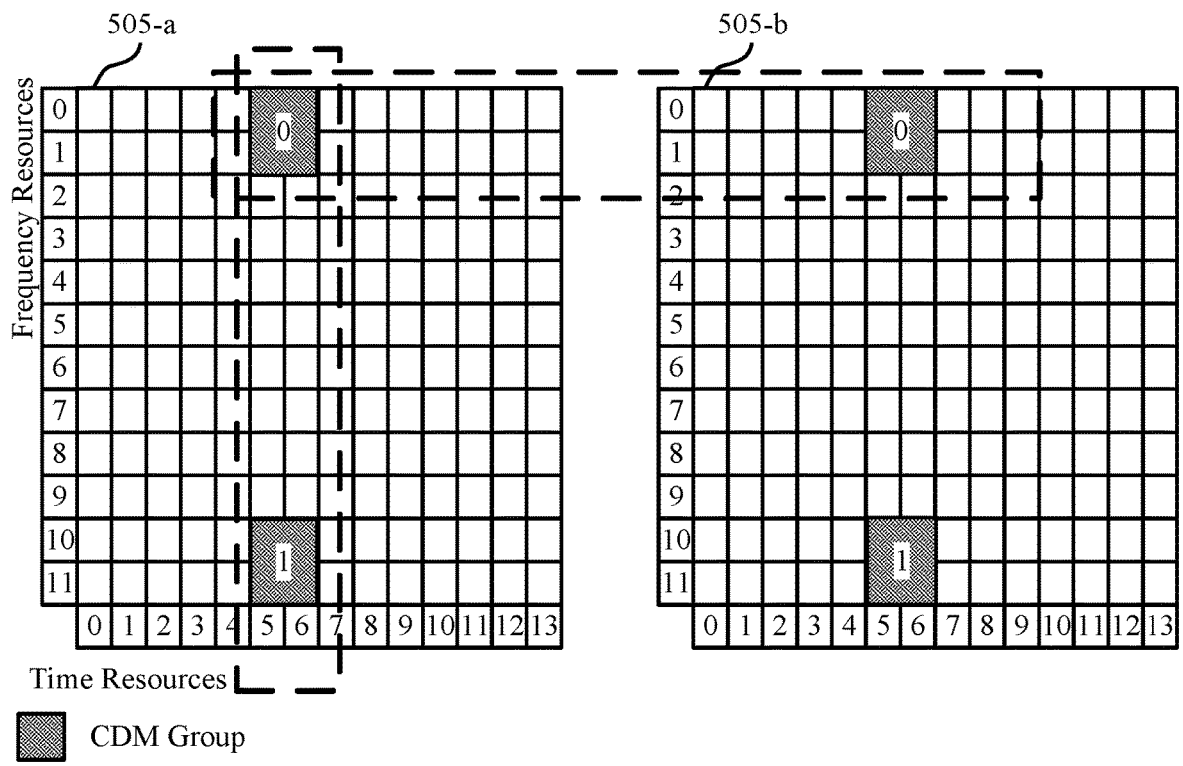

FIG. 5B illustrates an example of a resource configuration 502 that supports resource aggregation for dynamic antenna port adaptation in accordance with one or more aspects of the present disclosure. The resource configuration 502 may implement one or more aspects of wireless communications systems 100, 300, and/or network architecture 200. The resource configuration 502 may illustrate a possible antenna port configuration for obtaining a new CSI-RS resource based on a codebook configuration reflecting dynamic antenna adaptation at a network entity. The resource configuration 502 may include symbols 505 each including a code-division multiplexing (CDM) group 0 and 1.

In some examples, one or more resources of a set of CSI-RS resources may be aggregated according to CDM group. For example, for each resource, a CDM group aggregation order may be defined e.g., from lowest CDM index to highest CDM index. A UE may aggregate resources first within a symbol 505 then across symbols 505 according to CDM group. Similarly, the UE may separate resources first across symbol 505 then within a symbol 505 according to CDM group.

For example, the UE may receive a CSI report configuration that includes a codebook configuration for a set of 12 antenna ports. The set of CSI-RS resources may include 4 CDM groups each including 4 ports and the UE may determine to aggregate one or more CDM groups to obtain a 12-port CSI-RS resource. In such examples, the UE may aggregate CDM groups 0 and 1 within symbol 505-a and CDM group 0 within symbol 505-b to obtain a 12-port CSI-RS resource. As such the UE may aggregate first within a symbol and then across symbols according to CDM group index. (e.g., may aggregate a CDM group having a lowest index first).

Similarly, the UE may receive a CSI report configuration that includes a codebook configuration for a set of 8 antenna ports. The set of CSI-RS resources may include a single resource composed of 3 CDM groups each including 4 ports and the UE may determine to separate out one or more CDM groups to obtain an 8-port CSI-RS resource. In such examples, the UE may separate CDM group 0 of symbol 505-b from CDM groups 0 and 1 within symbol 505-a to obtain an 8-port CSI-RS resource. In some examples, CSI report configuration that includes a codebook configuration for a set of 4 antenna ports and the UE may further separate CDM group 1 of symbol 505-a from CDM group 0 of symbol 505-a to obtain the new CSI-RS resource. As such the UE may separate first across symbols and then within symbols according to CDM group index. (e.g., may separate a CDM group having a highest index first).

In some examples, rather than aggregating according to increasing (e.g., ascending) CDM group index and separating according to decreasing CDM index, the UE may determine to aggregate one or more CDM groups according to decreasing (e.g., descending) CDM group index and separating one or more CDM groups according to increasing CDM group index. Further, a UE may determine to aggregate or separate one or more resources according to the respective index of the CDM groups based on whether a number of CSI ports indicated by the codebook configuration is smaller of larger than the number of CSI ports associated with each resource of the set.

In some other examples, one or more resources of a set of CSI-RS resources may be aggregated according to a port level. For example, for each resource, a port aggregation order may be defined e.g., from lowest port index to highest port index, such that the UE may aggregate one or more resources according to port index first within a CDM group, then across CDM groups within a symbol 505, and then across symbols 505.

In some examples, rather than aggregating according to increasing port index and separating according to decreasing port index, the UE may determine to aggregate one or more resources according to a decreasing port index and separating one or more resources according to an increasing port index. Further, a UE may determine to aggregate or separate one or more resources according to the respective index of the ports based on whether a number of CSI ports indicated by the codebook configuration is smaller of larger than the number of CSI ports associated with each resource of the set. In some examples, a non-sequential order may be defined for aggregating according to CDM group index or port index.

Figure 6A:
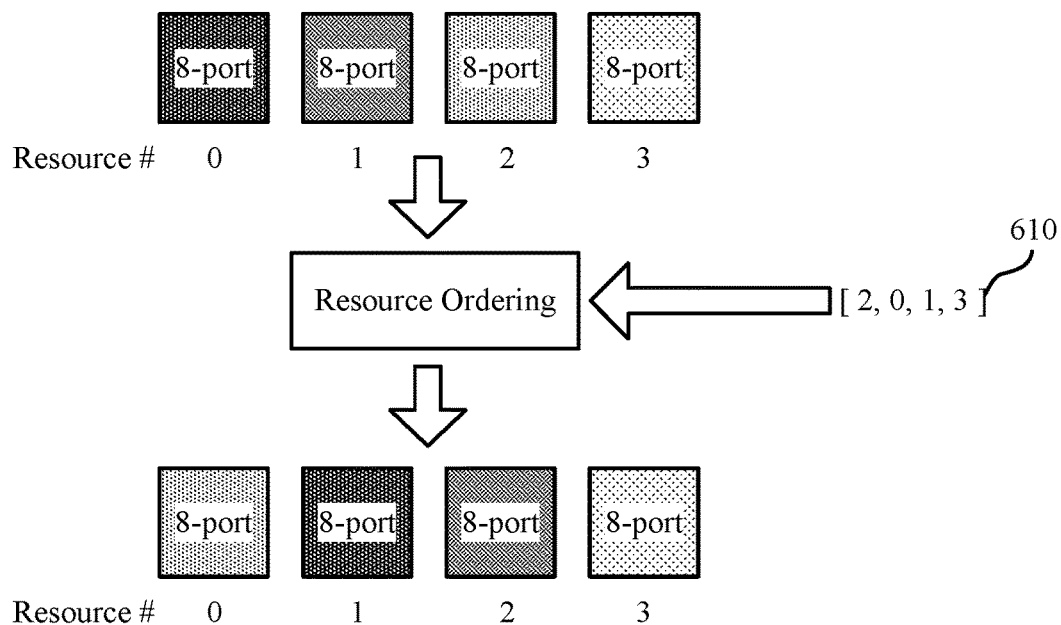
FIGS. 6A and 6B illustrate examples of resource ordering schemes that support resource aggregation for dynamic antenna port adaptation in accordance with one or more aspects of the present disclosure.

FIG. 6A illustrates an example of a resource ordering scheme 601 that supports resource aggregation for dynamic antenna port adaptation in accordance with one or more aspects of the present disclosure. The resource ordering scheme 601 may implement one or more aspects of wireless communications system 100, 300, and/or network architecture 200. The resource ordering scheme 601 may illustrate a possible resource aggregation order configuration.

In some examples, a UE may determine to aggregate one or more resources to form a new resource containing a larger number of CSI-RS ports based on an aggregation order. In such examples, the resources may be ordered in a predefined or configured resource aggregation order. In some examples, the order may be based on the nzp-CSI-RS-ResourceId in each NZP-CSI-RS-Resource of the CSI report configuration, either in ascending or descending order. In some other examples, the aggregation order may be based on either the ascending or descending order of the NZP CSI-RS resource list in the NZP-CSI-RS-ResourceSet of the CSI report configuration.

In some examples, the UE may be configured with the aggregation order via control signaling sch as RRC signaling. Additionally, or alternatively, the UE may be configured with a plurality of aggregation orders via control signaling sch as RRC signaling and may receive an indication to aggregate one or more resources according to a particular aggregation order indicated by received control information (e.g., MAC-CE).

For example, according to the example of resource ordering scheme 602, a set of CSI-RS resources may include Resources 0, 1, 2, and 3 each including 8 ports. The UE may receive an aggregation order 610 and may reorder the resources such that to obtain a 16 port resource, the UE may aggregate resources 2 and 0 (e.g., relabeled 0, and 1), to obtain a 24 port resource, the UE may aggregate resources 2, 0, and 1 (e.g., relabeled 0, 1, and 2), and to obtain a 32 port resource, the UE may aggregate resources 2, 0, 1, and 3 (e.g., relabeled 0, 1, 2 and 3).

In general, the aggregation order may define which resources are aggregated first, second, third and so on until a resource containing the number of ports indicated in the codebook configuration is obtained.

The UE may transmit a CSI report based on the newly obtained CSI resource, and the CSI report may include a CSI-RS resource indicator (CRI) that may be interpreted by a network entity according to the aggregation order (or separation order). For example, as described, the resources may be sorted with respect to the aggregation order and reindexed (or sequenced) 0, 1, 2, . . . Ks−1, where the CSI report may include a CRI=k indicating that a number of P-port CSI resource with indices 0, 1, . . . k are aggregated to formulate a resource containing (k+1)*P CSI-RS ports. As such, a bitwidth associated with the CRI may be conserved.

In the example of FIG. 6A, if the codebook configuration indicates a CSI resource having 24 ports, then the CRI may equal 2, indicating that relabeled resources 0, 1, and 2 were aggregated.

Figure 6B:
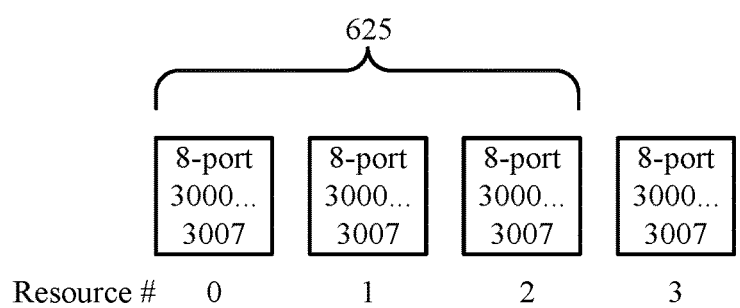

FIG. 6B illustrates an example of a resource ordering scheme 602 that supports resource aggregation for dynamic antenna port adaptation in accordance with one or more aspects of the present disclosure. The resource ordering scheme 602 may implement one or more aspects of wireless communications system 100, 300, and/or network architecture 200. The resource ordering scheme 602 may illustrate a possible resource configuration for resource aggregation in a same resource slot.

For example, a UE may perform channel estimation, and may align the phases of each ports to a reference resource element. In such examples, time-domain phase alignment may be relatively more complicated than alignment in the frequency domain.

Thus, a constraint on the slot-offset value of each CSI-RS resource in a same resource set when the resource set is associated with a CSI report configuration having multiple codebook configurations may be implemented. For example, CSI-RS resources to be aggregated may be associated with a same slot-offset. For example, when the resource set is associated with a CSI report configuration having multiple codebook configurations, the CSI-RS resources to be aggregated may have a same slot-offset (e.g., may be in a same slot) and may have a same periodicity.

In the example, of FIG. 6B, the UE may determine to aggregate resources 0, 1, and 2 to obtain a 24-port resource when resources 0, 1, and 2 are in a same slot and are associated with a same periodicity.

In some examples, antennas of an antenna panel may have dual polarization and an antenna port may be associated with a certain polarization. For example, a P-port resource has ports labeled from 3000 to 3000+(P−1). In some examples, even port indexes may be associated with a first polarization while odd port indices may be associated with a second polarization.

In some examples, the UE may aggregate resources having a same polarization by labeling the new CSI-RS resource accordingly. For example, regarding a 24-port aggregated resource 625, the ports of the resource 625 may be labeled from 3000 to 3023 starting with the ports of resource 0 to the ports of resource 2.

Figure 7:
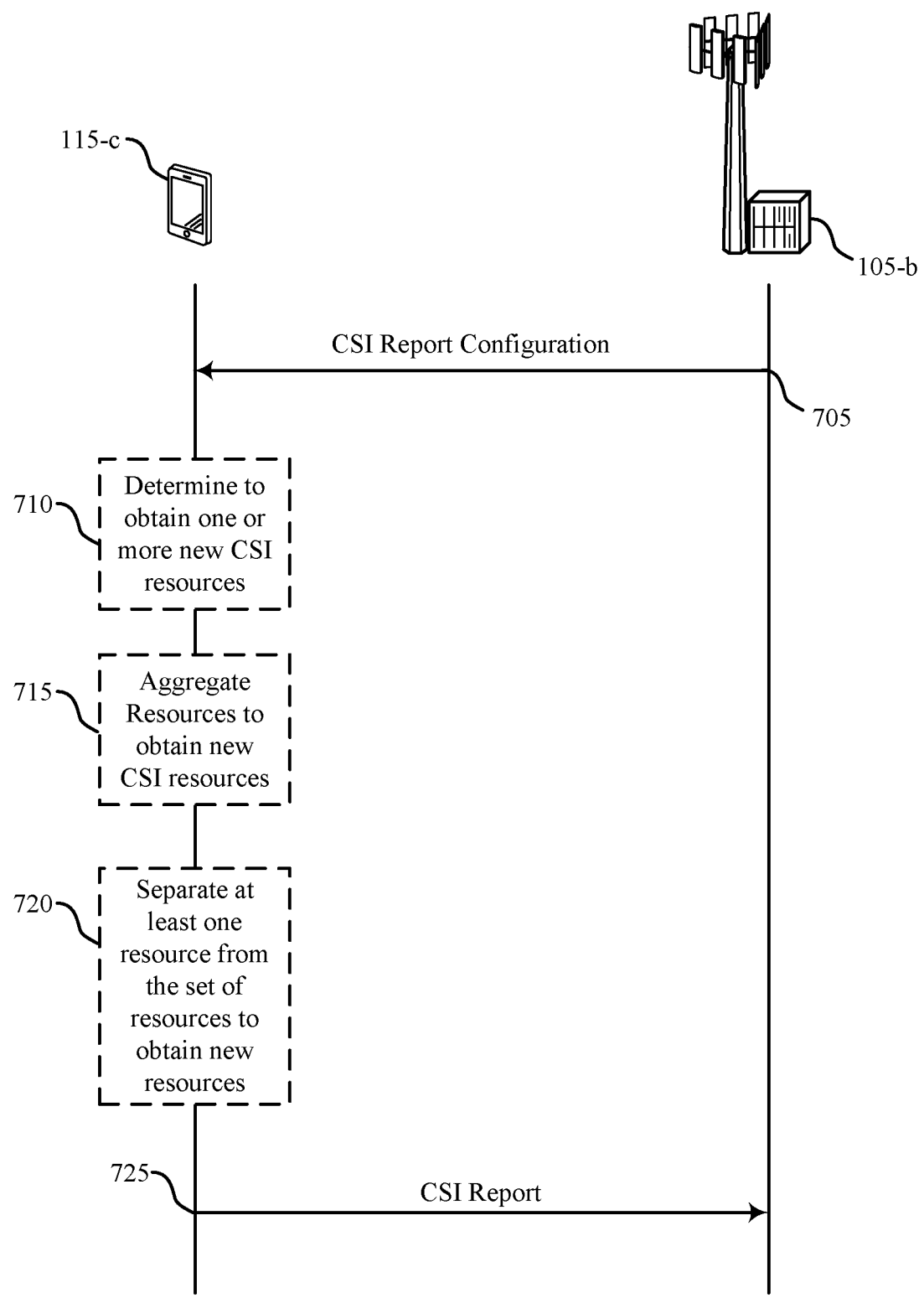
FIG. 7 illustrates an example of a process flow in a system that supports resource aggregation for dynamic antenna port adaptation in accordance with one or more aspects of the present disclosure.

FIG. 7 illustrates an example of a process flow 700 in a system that supports resource aggregation for dynamic antenna port adaptation in accordance with one or more aspects of the present disclosure. In some examples, process flow 700 may implement aspects of wireless communications system 100, 300, and/or network architecture 200. For example, process flow 700 includes a UE 115-c and a network entity 105-b, which may be examples of the corresponding devices described herein. Additionally, the operations in process flow 700 performed by the UE 115-c and the network entity 105-b may be respectively performed by a UE 115, a network entity 105, or another wireless device, and the example shown should not be construed as limiting.

In the process flow 700, the network entity 105-b may have one or more antenna panels each including multiple antenna elements. In some examples, the one or more antenna panels may be divided into one or more subpanels. For instance, the network entity 105-b may have four antenna panels, or may have one antenna panel divided into four subpanels, among other examples.

At 705, the network entity 105-b may transmit, and the UE 115-c may receive, signaling indicating a CSI report configuration. The CSI report configuration may indicate a set of CSI resources, and a codebook configuration indicating a set of antenna ports used by the network entity 105-b, among other control information. In some examples, the CSI report configuration may indicate that the antenna ports used by the network entity 105-b has changed.

At 710, the UE may determine to obtain one or more new CSI resources based on an aggregation rule, a separation rule, an aggregation order, a separation order, or the like. The UE 115-c may determine to obtain one or more new CSI resources based on whether the number of antenna ports indicated by the codebook configuration is larger or smaller than number of antenna ports of a set of CSI-RS resources.

In some examples, at 715, the UE 115-c may aggregated one or more resources to form a new CSI-RS resource including a larger number of antenna ports than a number of antenna ports associated with each resources of a set of CSI-RS resources.

In some examples, at 720, the UE 115-c may separate one or more resources to form a new CSI-RS resource including a smaller number of antenna ports than a number of antenna ports associated a set of CSI-RS resources.

At 725, the UE 115-c may transmit a CSI report based at least in part on the measured CSI for the set of reference signals received based on the newly obtained CSI resources such that the CSI report is coordinated to a number of CSI-RS ports in use at the network entity 105-b.

Figure 8:
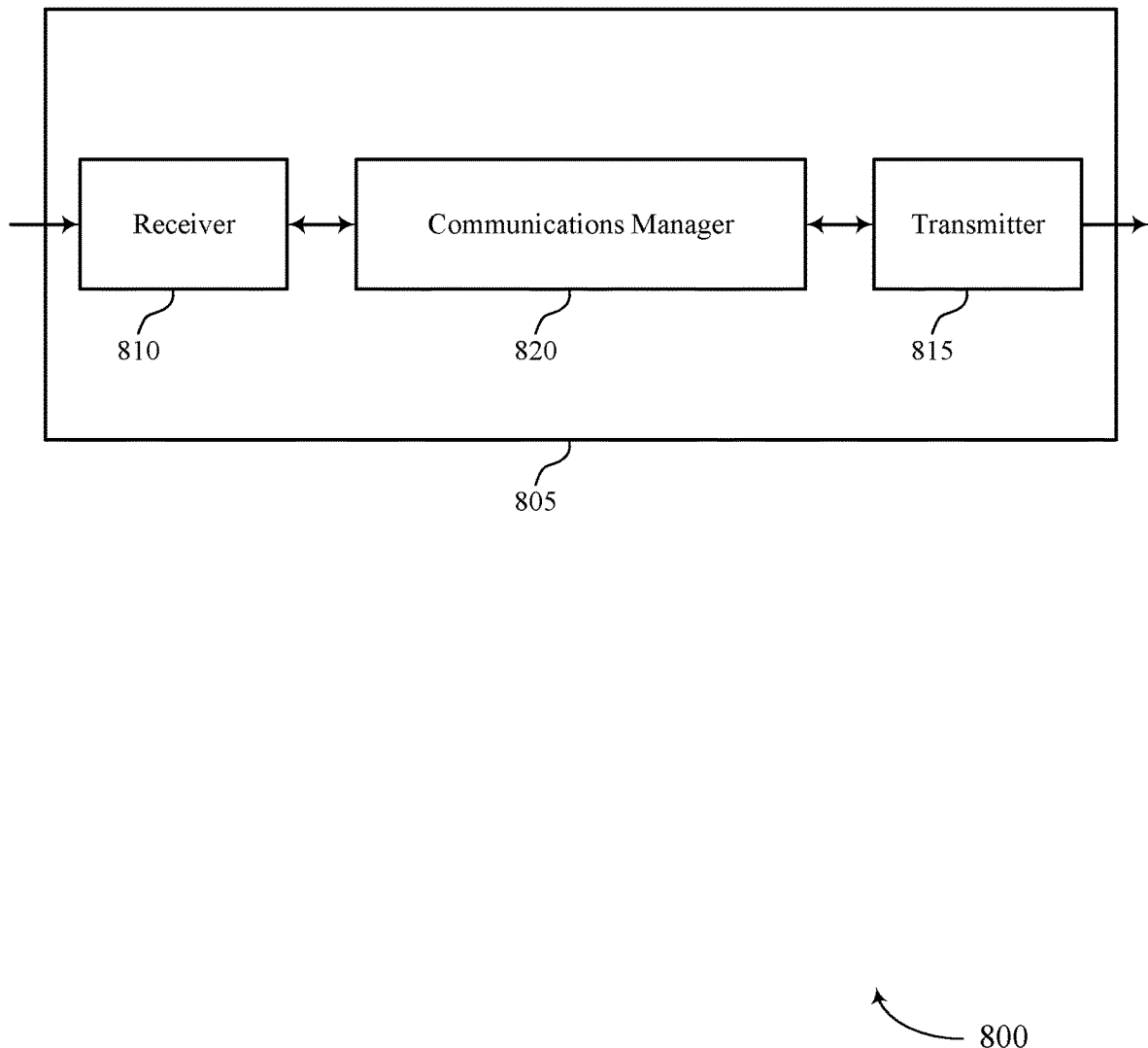
FIGS. 8 and 9 show block diagrams of devices that support resource aggregation for dynamic antenna port adaptation in accordance with one or more aspects of the present disclosure.

FIG. 8 shows a block diagram 800 of a device 805 that supports resource aggregation for dynamic antenna port adaptation in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to resource aggregation for dynamic antenna port adaptation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to resource aggregation for dynamic antenna port adaptation). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of resource aggregation for dynamic antenna port adaptation as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. For example, the communications manager 820 may be configured as or otherwise support a means for receiving a control message from a network entity indicating a CSI report configuration, the CSI report configuration indicating a set of resources and one or more codebook configurations. The communications manager 820 may be configured as or otherwise support a means for performing an operation to obtain one or more CSI resources (e.g., new resources) from the set of resources based on a first number of antenna ports associated with each resource of the set of resources and a second number of antenna ports associated with a codebook configuration of the one or more codebook configurations, where performing the operation obtains the one or more CSI resources for measuring CSI on the one or more CSI resources. The communications manager 820 may be configured as or otherwise support a means for transmitting a CSI report based on the measured CSI for the set of reference signals received on the one or more CSI resources.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced power consumption and more efficient utilization of communication resources, among other examples.

Figure 9:
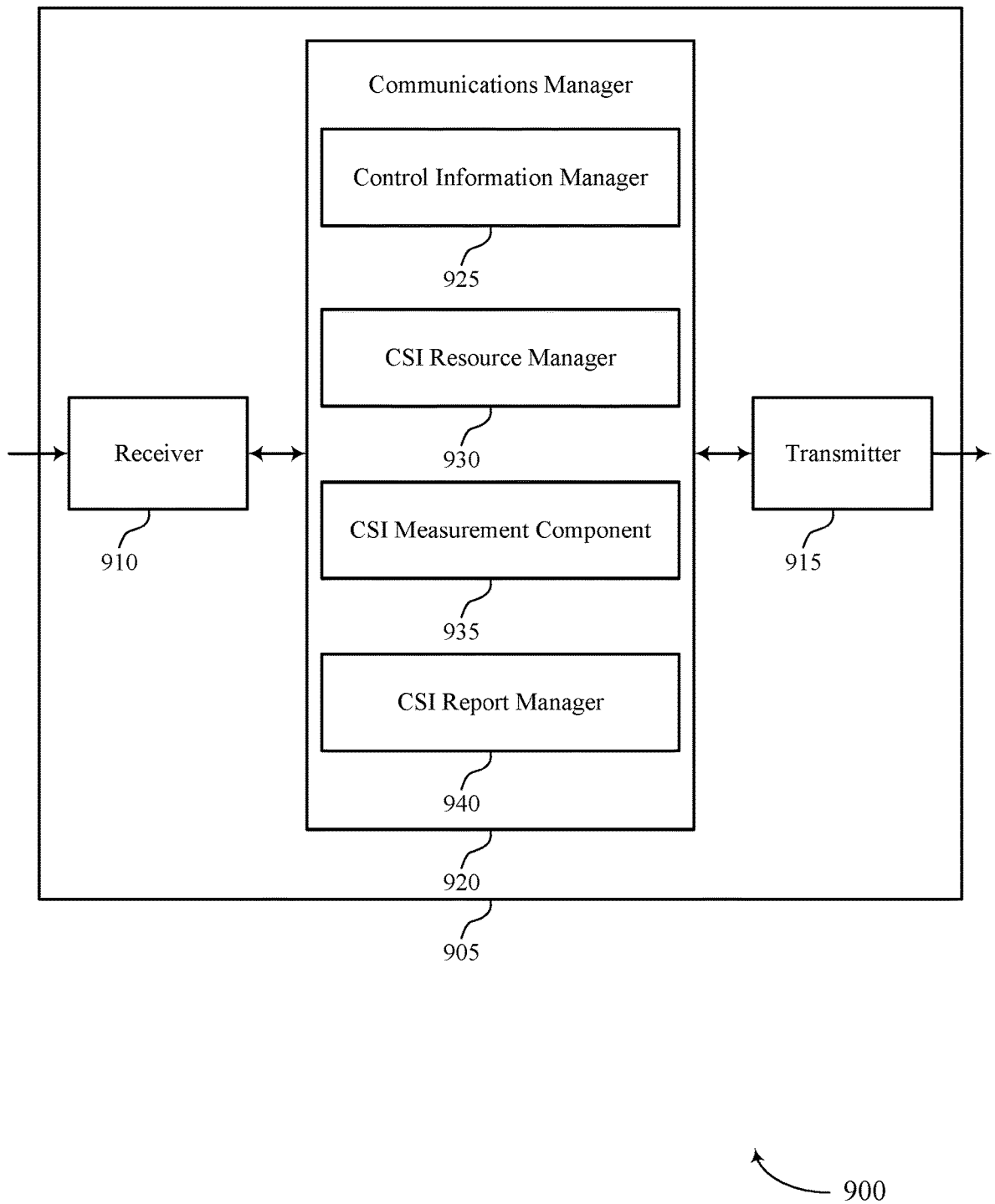

FIG. 9 shows a block diagram 900 of a device 905 that supports resource aggregation for dynamic antenna port adaptation in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to resource aggregation for dynamic antenna port adaptation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to resource aggregation for dynamic antenna port adaptation). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of resource aggregation for dynamic antenna port adaptation as described herein. For example, the communications manager 920 may include a control information manager 925, a CSI resource manager 930, a CSI Measurement Component 935, a CSI report manager 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. The control information manager 925 may be configured as or otherwise support a means for receiving a control message from a network entity indicating a CSI report configuration, the CSI report configuration indicating a set of resources and one or more codebook configurations. The CSI resource manager 930 may be configured as or otherwise support a means for performing an operation to obtain one or more CSI resources from the set of resources based on a first number of antenna ports associated with each resource of the set of resources and a second number of antenna ports associated with a codebook configuration of the one or more codebook configurations, where performing the operation obtains the one or more CSI resources for measuring CSI on the one or more CSI resources. The CSI report manager 935 may be configured as or otherwise support a means for measuring the CSI for a set of reference signals received on the one or more CSI resources. The CSI report manager 940 may be configured as or otherwise support a means for transmitting a CSI report based on the measured CSI for the set of reference signals received on the one or more CSI resources.

Figure 10:
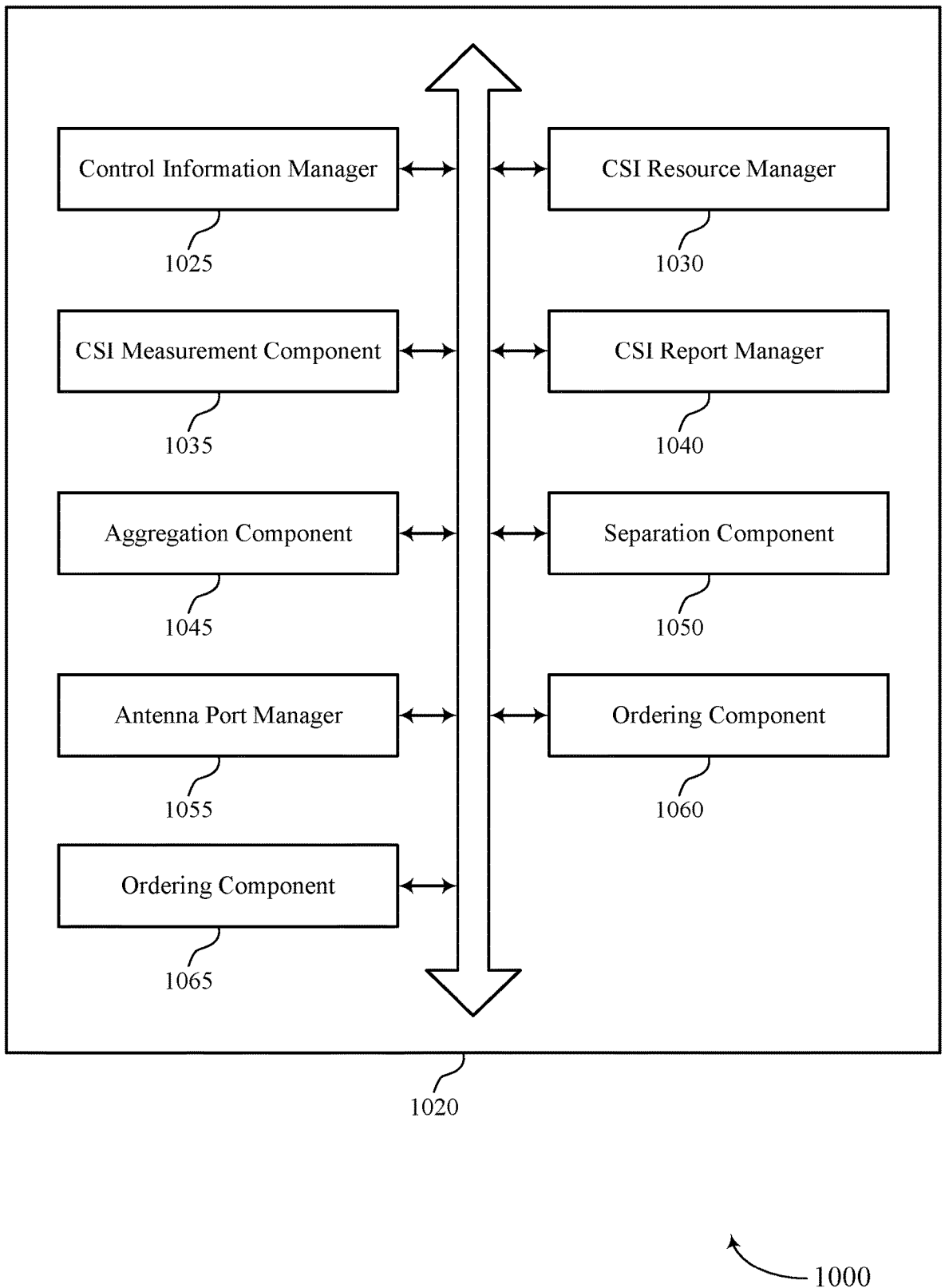
FIG. 10 shows a block diagram of a communications manager that supports resource aggregation for dynamic antenna port adaptation in accordance with one or more aspects of the present disclosure.

FIG. 10 shows a block diagram 1000 of a communications manager 1020 that supports resource aggregation for dynamic antenna port adaptation in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of resource aggregation for dynamic antenna port adaptation as described herein. For example, the communications manager 1020 may include a control information manager 1025, a CSI resource manager 1030, a CSI measurement component, a CSI report manager 1040, an aggregation component 1045, a separation component 1050, an antenna port manager 1055, an ordering component 1060, a labelling component 1065, or any combination thereof. Each of these components may communicate, directly or indirectly, with one another (e.g., via one or more buses).

The communications manager 1020 may support wireless communication at a UE in accordance with examples as disclosed herein. The control information manager 1025 may be configured as or otherwise support a means for receiving a control message from a network entity indicating a CSI report configuration, the CSI report configuration indicating a set of resources and one or more codebook configurations. The CSI resource manager 1030 may be configured as or otherwise support a means for performing an operation to obtain one or more CSI resources (e.g., one or more new resources) from the set of resources based on a first number of antenna ports associated with each resource of the set of resources and a second number of antenna ports associated with a codebook configuration of the one or more codebook configurations, where performing the operation obtains the one or more CSI resources for measuring CSI on the one or more CSI resources. The CSI measurement component 1035 may be configured as or otherwise support a means for measuring the CSI for a set of reference signals received on the one or more CSI resources. The CSI report manager 1040 may be configured as or otherwise support a means for transmitting a CSI report based on the measured CSI for the set of reference signals received on the one or more CSI resources.

In some examples, to support performing the operation, the aggregation component 1045 may be configured as or otherwise support a means for aggregating two or more resources of the set of resources in accordance with an aggregation rule, where the two or more resources are aggregated to form a CSI resource corresponding to the second number of antenna ports.

In some examples, to support aggregating the two or more resources in accordance with the aggregation rule, the aggregation component 1045 may be configured as or otherwise support a means for aggregating the two or more resources based on respective indices of the two or more resources.

In some examples, to support aggregating the two or more resources in accordance with the aggregation rule, the aggregation component 1045 may be configured as or otherwise support a means for aggregating the two or more resources based on respective code-division multiplexing group indices associated with each resource of the two or more resources, where the two or more resources are aggregated across resource blocks after being aggregated across code-division multiplexing groups of a same resource block.

In some examples, to support aggregating the two or more resources in accordance with the aggregation rule, the aggregation component 1045 may be configured as or otherwise support a means for aggregating the two or more resources based on respective port indices, where the two or more resources are aggregated within a code-division multiplexing group and across resource blocks after being aggregated across code-division multiplexing groups of a same resource block.

In some examples, to support performing the operation, the separation component 1050 may be configured as or otherwise support a means for separating at least one resource of the set of resources into two or more resources in accordance with a separation rule, where each resource of the two or more resources forms a respective CSI resource that corresponds to the second number of antenna ports.

In some examples, to support separating the at least one resource in accordance with the separation rule, the separation component 1050 may be configured as or otherwise support a means for separating the at least one resource based on respective indices of the set of resources.

In some examples, to support separating the at least one resource in accordance with the separation rule, the separation component 1050 may be configured as or otherwise support a means for separating the at least one resource based on respective code-division multiplexing group indices associated with each resource of the two or more resources.

In some examples, to support separating the at least one resource in accordance with the separation rule, the separation component 1050 may be configured as or otherwise support a means for separating the at least one resource based on respective port indices.

In some examples, the antenna port manager 1055 may be configured as or otherwise support a means for determining to perform the operation in accordance with an aggregation rule or a separation rule based on whether the second number of antenna ports is larger or smaller than the first number of antenna ports.

In some examples, the ordering component 1060 may be configured as or otherwise support a means for ordering a subset of resources of the set of resources based on an aggregation order, where the operation to obtain the one or more CSI resources from the set of resources is performed after the ordering.

In some examples, the aggregation order includes an ascending order of resource identifiers of the subset of resources.

In some examples, the aggregation order includes a descending order of resource identifiers of the subset of resources.

In some examples, the aggregation order includes an ascending order of a resource list including the subset of resources.

In some examples, the aggregation order includes a descending order of a resource list including the subset of resources.

In some examples, the control information manager 1025 may be configured as or otherwise support a means for receiving signaling indicating a set of one or more aggregation orders including the aggregation order.

In some examples, the control information manager 1025 may be configured as or otherwise support a means for receiving a second control message indicating the aggregation order from the set of one or more aggregation orders.

In some examples, to support performing the operation, the aggregation component 1045 may be configured as or otherwise support a means for aggregating two or more resources of the set of resources that have a same slot offset value and a same periodicity based on the one or more codebook configurations.

In some examples, to support performing the operation, the aggregation component 1045 may be configured as or otherwise support a means for aggregating a first resource of the set of resources with a second resource of the set of resources to form an aggregated resource corresponding to the second number of antenna ports. In some examples, to support performing the operation, the labelling component 1065 may be configured as or otherwise support a means for labelling each antenna port of the second number of antenna ports based on a total number of antenna ports included in the aggregated resource.

In some examples, a first set of antenna ports associated with the first resource includes a first sequence of antenna ports. In some examples, a second set of antenna ports associated with the second resource includes a second sequence of antenna ports that follows the first sequence of antenna ports.

In some examples, the CSI report manager 1040 may be configured as or otherwise support a means for transmitting, within the CSI report, an indication of the one or more CSI resources based on performing the operation to obtain the one or more CSI resources from the set of resources.

Figure 11:
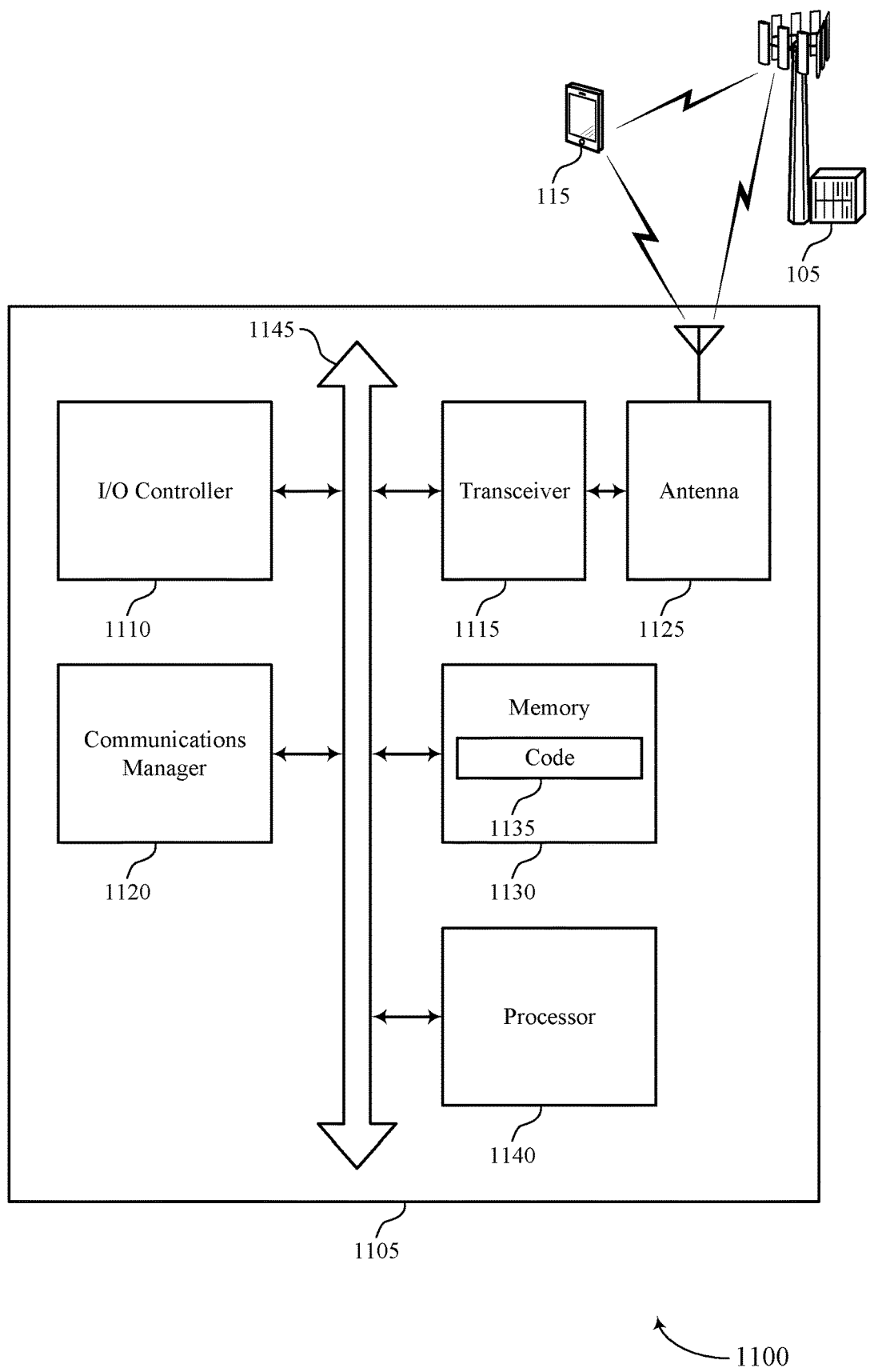
FIG. 11 shows a diagram of a system including a device that supports resource aggregation for dynamic antenna port adaptation in accordance with one or more aspects of the present disclosure.

FIG. 11 shows a diagram of a system 1100 including a device 1105 that supports resource aggregation for dynamic antenna port adaptation in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting resource aggregation for dynamic antenna port adaptation). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving a control message from a network entity indicating a CSI report configuration, the CSI report configuration indicating a set of resources and one or more codebook configurations. The communications manager 1120 may be configured as or otherwise support a means for performing an operation to obtain one or more CSI resources from the set of resources based on a first number of antenna ports associated with each resource of the set of resources and a second number of antenna ports associated with a codebook configuration of the one or more codebook configurations, where performing the operation obtains the one or more CSI resources for measuring CSI on the one or more CSI resources. The communications manager 1120 may be configured as or otherwise support a means for measuring the CSI for a set of reference signals received on the one or more CSI resources. The communications manager 1120 may be configured as or otherwise support a means for transmitting a CSI report based on the measured CSI for the set of reference signals received on the one or more CSI resources.

By including or configuring the communications manager 1120 in accordance with examples as described herein, the device 1105 may support techniques for reduced power consumption, more efficient utilization of communication resources, and improved coordination between devices, among other examples.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of resource aggregation for dynamic antenna port adaptation as described herein, or the processor 1140 and the memory 1130 may be otherwise configured to perform or support such operations.

Figure 12:
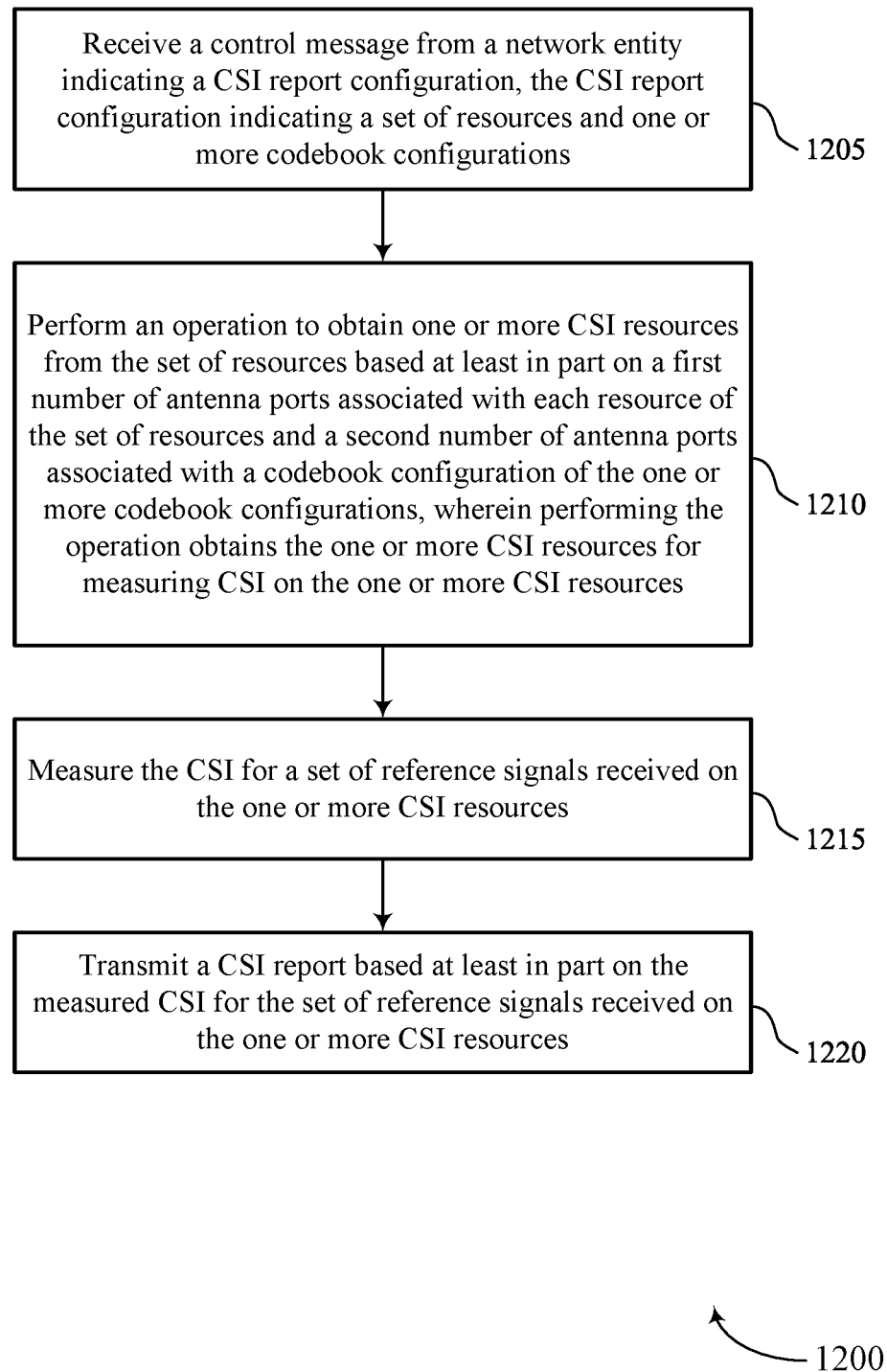
FIGS. 12 through 16 show flowcharts illustrating methods that support resource aggregation for dynamic antenna port adaptation in accordance with one or more aspects of the present disclosure.

FIG. 12 shows a flowchart illustrating a method 1200 that supports resource aggregation for dynamic antenna port adaptation in accordance with one or more aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1205, the method may include receiving a control message from a network entity indicating a CSI report configuration, the CSI report configuration indicating a set of resources and one or more codebook configurations. The operations of 1205 may be performed in accordance with examples as disclosed herein. In some examples, aspects of the operations of 1205 may be performed by a control information manager 1025 as described with reference to FIG. 10.

At 1210, the method may include performing an operation to obtain one or more CSI resources from the set of resources based on a first number of antenna ports associated with each resource of the set of resources and a second number of antenna ports associated with a codebook configuration of the one or more codebook configurations, where performing the operation obtains the one or more CSI resources for measuring CSI on the one or more CSI resources. The operations of 1210 may be performed in accordance with examples as disclosed herein. In some examples, aspects of the operations of 1210 may be performed by a CSI resource manager 1030 as described with reference to FIG. 10.

At 1215, the method may include measuring the CSI for a set of reference signals received on the one or more CSI resources. The operations of 1215 may be performed in accordance with examples as disclosed herein. In some examples, aspects of the operations of 1215 may be performed by a CSI measurement component 1035 as described with reference to FIG. 10.

At 1220, the method may include transmitting a CSI report based on the measured CSI for the set of reference signals received on the one or more CSI resources. The operations of 1220 may be performed in accordance with examples as disclosed herein. In some examples, aspects of the operations of 1220 may be performed by a CSI report manager 1040 as described with reference to FIG. 10.

Figure 13:
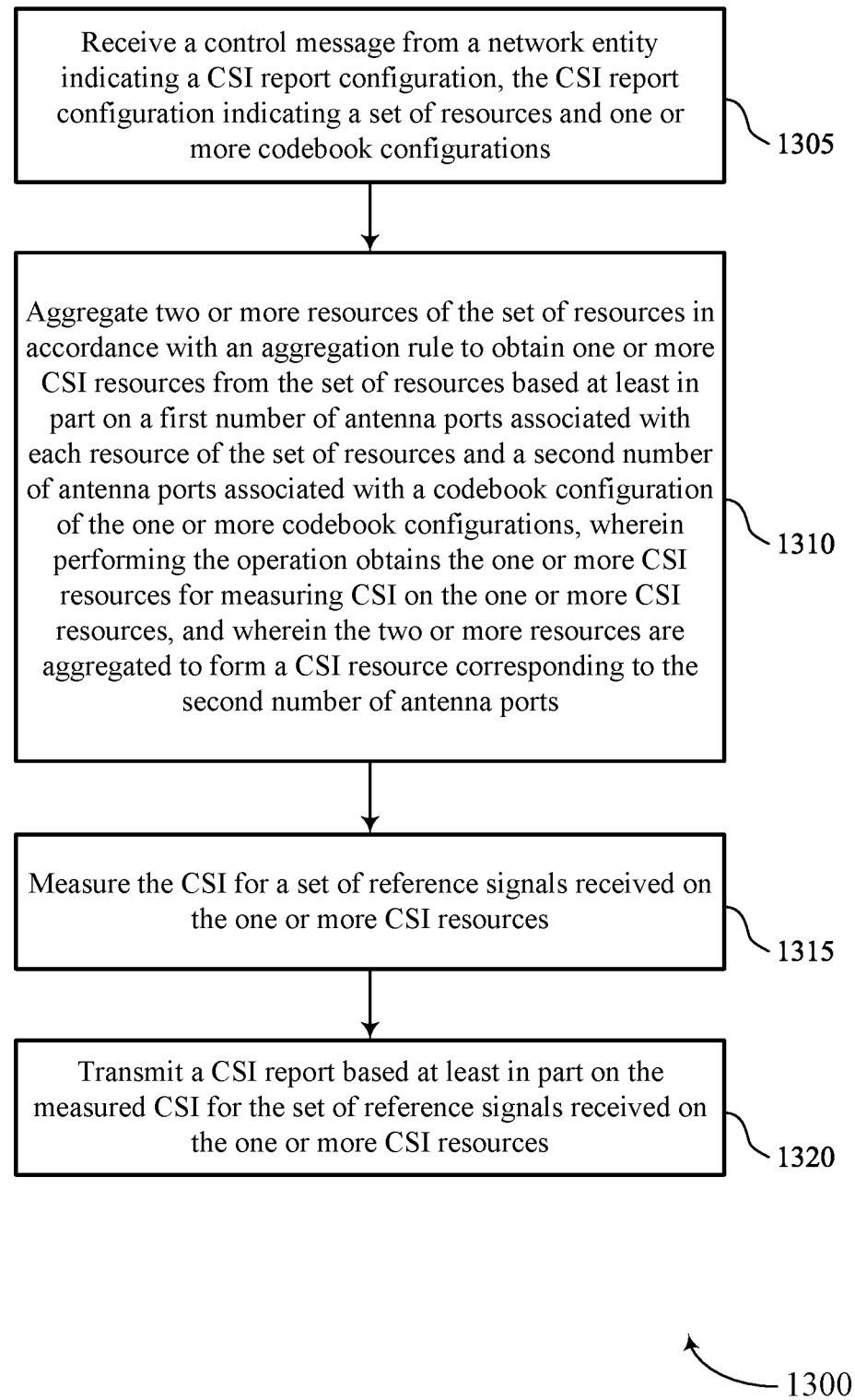

FIG. 13 shows a flowchart illustrating a method 1300 that supports resource aggregation for dynamic antenna port adaptation in accordance with one or more aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1305, the method may include receiving a control message from a network entity indicating a CSI report configuration, the CSI report configuration indicating a set of resources and one or more codebook configurations. The operations of 1305 may be performed in accordance with examples as disclosed herein. In some examples, aspects of the operations of 1305 may be performed by a control information manager 1025 as described with reference to FIG. 10.

At 1310, the method may include aggregating two or more resources of the set of resources in accordance with an aggregation rule to obtain one or more new resources from the set of resources based on a first number of antenna ports associated with each resource of the set of resources and a second number of antenna ports associated with a codebook configuration of the one or more codebook configurations, where performing the operation forms one or more CSI resources for measuring CSI on the one or more CSI resources. In some examples, the two or more resources are aggregated to form a CSI resource corresponding to the second number of antenna ports. The operations of 1310 may be performed in accordance with examples as disclosed herein. In some examples, aspects of the operations of 1310 may be performed by an aggregation component 1045 as described with reference to FIG. 10.

At 1315, the method may include measuring the CSI for a set of reference signals received on the one or more CSI resources. The operations of 1315 may be performed in accordance with examples as disclosed herein. In some examples, aspects of the operations of 1315 may be performed by a CSI measurement component 1035 as described with reference to FIG. 10.

At 1320, the method may include transmitting a CSI report based on the measured CSI for the set of reference signals received on the one or more CSI resources. The operations of 1320 may be performed in accordance with examples as disclosed herein. In some examples, aspects of the operations of 1320 may be performed by a CSI report manager 1040 as described with reference to FIG. 10.

Figure 14:
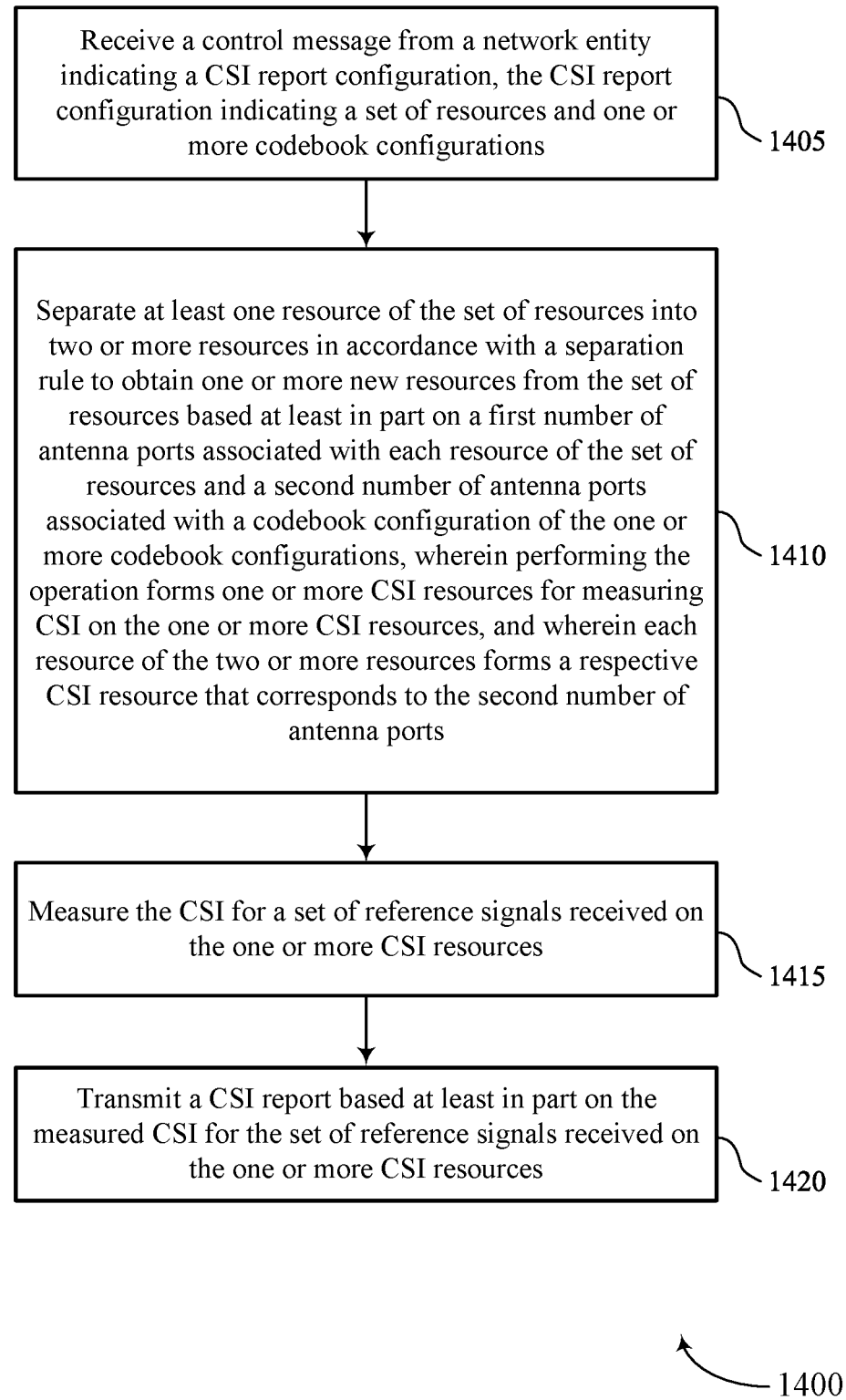

FIG. 14 shows a flowchart illustrating a method 1400 that supports resource aggregation for dynamic antenna port adaptation in accordance with one or more aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1405, the method may include receiving a control message from a network entity indicating a CSI report configuration, the CSI report configuration indicating a set of resources and one or more codebook configurations. The operations of 1405 may be performed in accordance with examples as disclosed herein. In some examples, aspects of the operations of 1405 may be performed by a control information manager 1025 as described with reference to FIG. 10.

At 1410, the method may include separating at least one resource of the set of resources into two or more resources in accordance with a separation rule to obtain one or more new resources from the set of resources based on a first number of antenna ports associated with each resource of the set of resources and a second number of antenna ports associated with a codebook configuration of the one or more codebook configurations, where performing the operation forms one or more CSI resources for measuring CSI on the one or more CSI resources. In some examples, each resource of the two or more resources forms a respective CSI resource that corresponds to the second number of antenna ports. The operations of 1410 may be performed in accordance with examples as disclosed herein. In some examples, aspects of the operations of 1410 may be performed by a separation component 1050 as described with reference to FIG. 10.

At 1415, the method may include measuring the CSI for a set of reference signals received on the one or more CSI resources. The operations of 1415 may be performed in accordance with examples as disclosed herein. In some examples, aspects of the operations of 1415 may be performed by a CSI measurement component 1035 as described with reference to FIG. 10.

At 1420, the method may include transmitting a CSI report based on the measured CSI for the set of reference signals received on the one or more CSI resources. The operations of 1420 may be performed in accordance with examples as disclosed herein. In some examples, aspects of the operations of 1420 may be performed by a CSI report manager 1040 as described with reference to FIG. 10.

Figure 15:
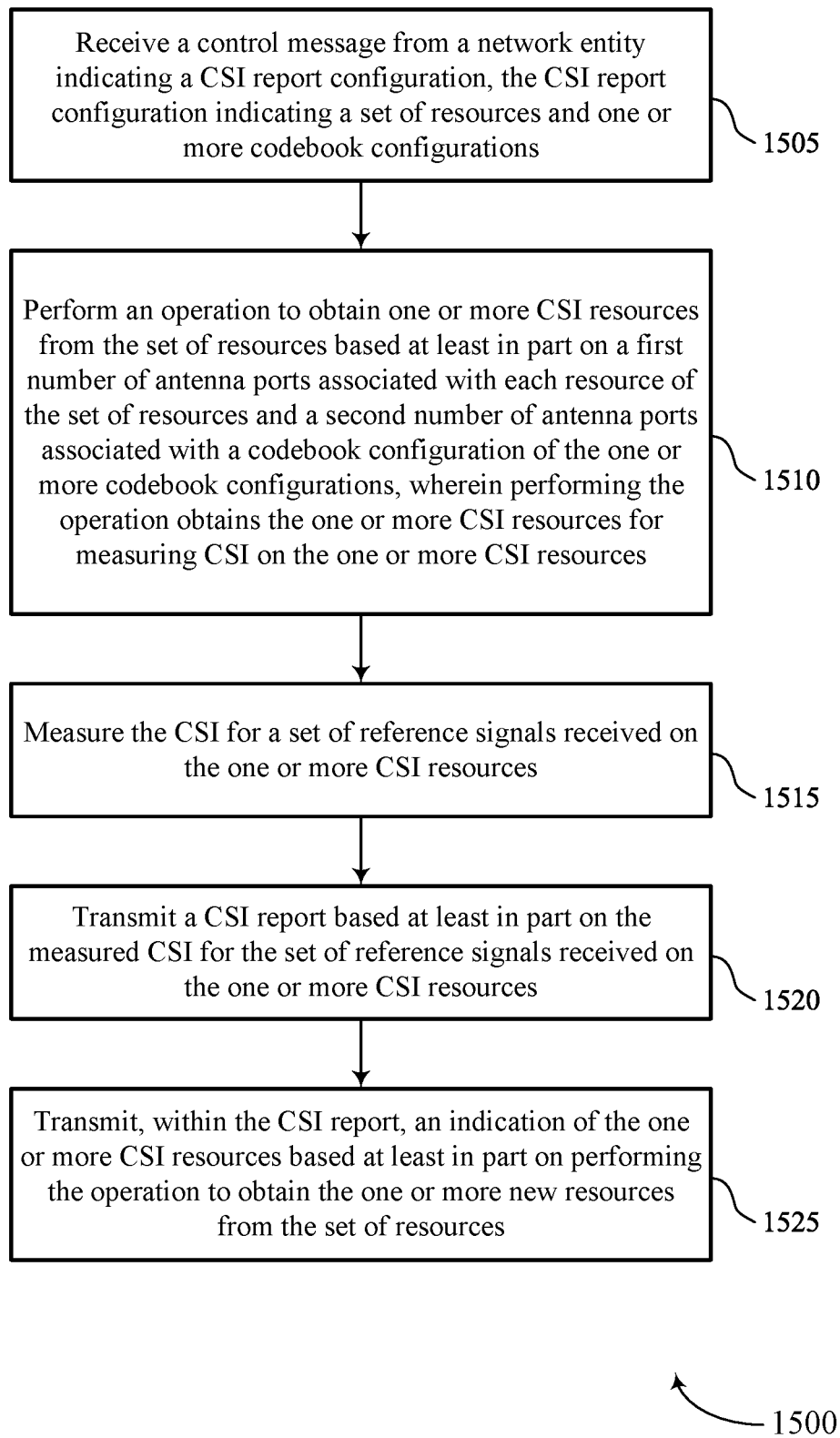

FIG. 15 shows a flowchart illustrating a method 1500 that supports resource aggregation for dynamic antenna port adaptation in accordance with one or more aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1505, the method may include receiving a control message from a network entity indicating a CSI report configuration, the CSI report configuration indicating a set of resources and one or more codebook configurations. The operations of 1505 may be performed in accordance with examples as disclosed herein. In some examples, aspects of the operations of 1505 may be performed by a control information manager 1025 as described with reference to FIG. 10.

At 1510, the method may include performing an operation to obtain one or more new resources from the set of resources based on a first number of antenna ports associated with each resource of the set of resources and a second number of antenna ports associated with a codebook configuration of the one or more codebook configurations, where performing the operation forms one or more CSI resources for measuring CSI on the one or more CSI resources. The operations of 1510 may be performed in accordance with examples as disclosed herein. In some examples, aspects of the operations of 1510 may be performed by a CSI resource manager 1030 as described with reference to FIG. 10.

At 1515, the method may include measuring the CSI for a set of reference signals received on the one or more CSI resources. The operations of 1515 may be performed in accordance with examples as disclosed herein. In some examples, aspects of the operations of 1515 may be performed by a CSI measurement component 1035 as described with reference to FIG. 10.

At 1520, the method may include transmitting a CSI report based on the measured CSI for the set of reference signals received on the one or more CSI resources. The operations of 1520 may be performed in accordance with examples as disclosed herein. In some examples, aspects of the operations of 1520 may be performed by a CSI report manager 1040 as described with reference to FIG. 10.

At 1525, the method may include transmitting, within the CSI report, an indication of the one or more CSI resources based on performing the operation to obtain the one or more new resources from the set of resources. The operations of 1525 may be performed in accordance with examples as disclosed herein. In some examples, aspects of the operations of 1525 may be performed by a CSI report manager 1040 as described with reference to FIG. 10.

Figure 16:
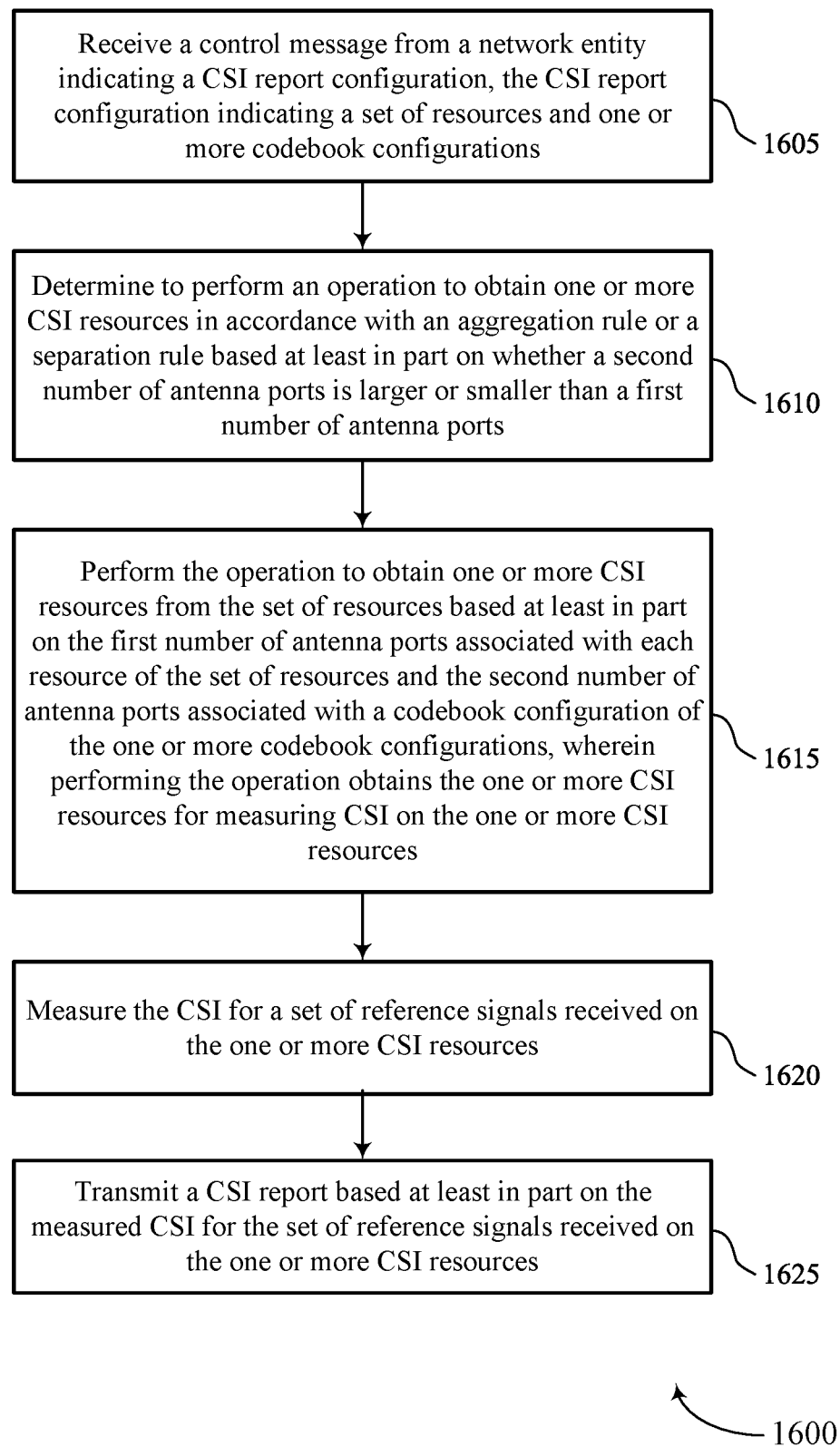

FIG. 16 shows a flowchart illustrating a method 1600 that supports resource aggregation for dynamic antenna port adaptation in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving a control message from a network entity indicating a CSI report configuration, the CSI report configuration indicating a set of resources and one or more codebook configurations. The operations of 1605 may be performed in accordance with examples as disclosed herein. In some examples, aspects of the operations of 1605 may be performed by a control information manager 1025 as described with reference to FIG. 10.

At 1610, the method may include determining to perform an operation to obtain one or more new resources from the set of resources in accordance with an aggregation rule or a separation rule based on whether a second number of antenna ports is larger or smaller than a first number of antenna ports. The operations of 1610 may be performed in accordance with examples as disclosed herein. In some examples, aspects of the operations of 1610 may be performed by an antenna port manager 1055 as described with reference to FIG. 10.

At 1615, the method may include performing the operation to obtain one or more new resources from the set of resources based on the first number of antenna ports associated with each resource of the set of resources and the second number of antenna ports associated with a codebook configuration of the one or more codebook configurations, where performing the operation forms one or more CSI resources for measuring CSI on the one or more CSI resources. The operations of 1615 may be performed in accordance with examples as disclosed herein. In some examples, aspects of the operations of 1615 may be performed by a CSI resource manager 1030 as described with reference to FIG. 10.

At 1620, the method may include measuring the CSI for a set of reference signals received on the one or more CSI resources. The operations of 1620 may be performed in accordance with examples as disclosed herein. In some examples, aspects of the operations of 1620 may be performed by a CSI measurement component 1035 as described with reference to FIG. 10.

At 1625, the method may include transmitting a CSI report based on the measured CSI for the set of reference signals received on the one or more CSI resources. The operations of 1625 may be performed in accordance with examples as disclosed herein. In some examples, aspects of the operations of 1625 may be performed by a CSI report manager 1040 as described with reference to FIG. 10.

The following provides an overview of aspects of the present disclosure:

Aspect 1: A method for wireless communication at a UE, comprising: receiving a control message from a network entity indicating a CSI report configuration, the CSI report configuration indicating a set of resources and one or more codebook configurations; performing an operation to obtain one or more CSI resources from the set of resources based at least in part on a first number of antenna ports associated with each resource of the set of resources and a second number of antenna ports associated with a codebook configuration of the one or more codebook configurations, wherein performing the operation obtains the one or more CSI resources for measuring CSI on the one or more CSI resources; measuring the CSI for a set of reference signals received on the one or more CSI resources; and transmitting a CSI report based at least in part on the measured CSI for the set of reference signals received on the one or more CSI resources.

Aspect 2: The method of aspect 1, wherein performing the operation comprises: aggregating two or more resources of the set of resources in accordance with an aggregation rule, wherein the two or more resources are aggregated to form a CSI resource corresponding to the second number of antenna ports.

Aspect 3: The method of aspect 2, wherein aggregating the two or more resources in accordance with the aggregation rule comprises: aggregating the two or more resources based at least in part on respective indices of the two or more resources.

Aspect 4: The method of any of aspects 2 through 3, wherein aggregating the two or more resources in accordance with the aggregation rule comprises: aggregating the two or more resources based at least in part on respective code-division multiplexing group indices associated with each resource of the two or more resources, wherein the two or more resources are aggregated across resource blocks after being aggregated across code-division multiplexing groups of a same resource block.

Aspect 5: The method of any of aspects 2 through 4, wherein aggregating the two or more resources in accordance with the aggregation rule comprises: aggregating the two or more resources based at least in part on respective port indices, wherein the two or more resources are aggregated within a code-division multiplexing group and across resource blocks after being aggregated across code-division multiplexing groups of a same resource block.

Aspect 6: The method of any of aspects 1 through 5, wherein performing the operation comprises: separating at least one resource of the set of resources into two or more resources in accordance with a separation rule, wherein each resource of the two or more resources forms a respective CSI resource that corresponds to the second number of antenna ports.

Aspect 7: The method of aspect 6, wherein separating the at least one resource in accordance with the separation rule comprises: separating the at least one resource based at least in part on respective indices of the set of resources.

Aspect 8: The method of any of aspects 6 through 7, wherein separating the at least one resource in accordance with the separation rule comprises: separating the at least one resource based at least in part on respective code-division multiplexing group indices associated with each resource of the two or more resources.

Aspect 9: The method of any of aspects 6 through 8, wherein separating the at least one resource in accordance with the separation rule comprises: separating the at least one resource based at least in part on respective port indices.

Aspect 10: The method of any of aspects 1 through 9, further comprising: determining to perform the operation in accordance with an aggregation rule or a separation rule based at least in part on whether the second number of antenna ports is larger or smaller than the first number of antenna ports.

Aspect 11: The method of any of aspects 1 through 10, further comprising: ordering a subset of resources of the set of resources based at least in part on an aggregation order, wherein the operation to obtain the one or more CSI resources from the set of resources is performed after the ordering.

Aspect 12: The method of aspect 11, wherein the aggregation order comprises an ascending order of resource identifiers of the subset of resources.

Aspect 13: The method of aspect 11, wherein the aggregation order comprises a descending order of resource identifiers of the subset of resources.

Aspect 14: The method of aspect 11, wherein the aggregation order comprises an ascending order of a resource list comprising the subset of resources.

Aspect 15: The method of aspect 11, wherein the aggregation order comprises a descending order of a resource list comprising the subset of resources.

Aspect 16: The method of any of aspects 11 through 15, further comprising: receiving signaling indicating a set of one or more aggregation orders including the aggregation order.

Aspect 17: The method of aspect 16, further comprising: receiving a second control message indicating the aggregation order from the set of one or more aggregation orders.

Aspect 18: The method of any of aspects 1 through 17, wherein the set of resources is associated with the one or more codebook configurations, and wherein performing the operation comprises: aggregating two or more resources of the set of resources that have a same slot offset value and a same periodicity based at least in part on the one or more codebook configurations.

Aspect 19: The method of any of aspects 1 through 18, wherein performing the operation comprises: aggregating a first resource of the set of resources with a second resource of the set of resources to form an aggregated resource corresponding to the second number of antenna ports; and labelling each antenna port of the second number of antenna ports based at least in part on a total number of antenna ports included in the aggregated resource.

Aspect 20: The method of aspect 19, wherein a first set of antenna ports associated with the first resource comprises a first sequence of antenna ports; and a second set of antenna ports associated with the second resource comprises a second sequence of antenna ports that follows the first sequence of antenna ports.

Aspect 21: The method of any of aspects 1 through 20, further comprising: transmitting, within the CSI report, an indication of the one or more CSI resources based at least in part on performing the operation to obtain the one or more CSI resources from the set of resources.

Aspect 22: An apparatus for wireless communication at a UE, comprising a processor; memory coupled with the processor; and instructions stored in the memory and executable by the processor to cause the apparatus to perform a method of any of aspects 1 through 21.

Aspect 23: An apparatus for wireless communication at a UE, comprising at least one means for performing a method of any of aspects 1 through 21.

Aspect 24: A non-transitory computer-readable medium storing code for wireless communication at a UE, the code comprising instructions executable by a processor to perform a method of any of aspects 1 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a control message from a network entity indicating a channel state information (CSI) report configuration, the CSI report configuration indicating a set of resources and one or more codebook configurations;
   performing an operation to obtain one or more CSI resources from the set of resources based at least in part on a difference between a first quantity of antenna ports associated with each resource of the set of resources and a second quantity of antenna ports associated with a codebook configuration of the one or more codebook configurations, wherein performing the operation comprises obtaining the one or more CSI resources for measuring CSI on the one or more CSI resources;
   measuring the CSI for a set of reference signals received on the one or more CSI resources; and
   transmitting a CSI report based at least in part on the measured CSI for the set of reference signals received on the one or more CSI resources.

2. The method of claim 1, wherein performing the operation comprises:
   aggregating two or more resources of the set of resources in accordance with an aggregation rule, wherein the two or more resources are aggregated to form a CSI resource corresponding to the second quantity of antenna ports.

3. The method of claim 2, wherein aggregating the two or more resources in accordance with the aggregation rule comprises:
   aggregating the two or more resources based at least in part on respective indices of the two or more resources.

4. The method of claim 2, wherein aggregating the two or more resources in accordance with the aggregation rule comprises:
   aggregating the two or more resources based at least in part on respective code-division multiplexing group indices associated with each resource of the two or more resources, wherein the two or more resources are aggregated across resource blocks after being aggregated across code-division multiplexing groups of a same resource block.

5. The method of claim 2, wherein aggregating the two or more resources in accordance with the aggregation rule comprises:
   aggregating the two or more resources based at least in part on respective port indices, wherein the two or more resources are aggregated within a code-division multiplexing group and across resource blocks after being aggregated across code-division multiplexing groups of a same resource block.

6. The method of claim 1, wherein performing the operation comprises:
   separating at least one resource of the set of resources into two or more resources in accordance with a separation rule, wherein each resource of the two or more resources forms a respective CSI resource that corresponds to the second quantity of antenna ports.

7. The method of claim 6, wherein separating the at least one resource in accordance with the separation rule comprises:
   separating the at least one resource based at least in part on respective indices of the set of resources.

8. The method of claim 6, wherein separating the at least one resource in accordance with the separation rule comprises:
   separating the at least one resource based at least in part on respective code-division multiplexing group indices associated with each resource of the two or more resources.

9. The method of claim 6, wherein separating the at least one resource in accordance with the separation rule comprises:
   separating the at least one resource based at least in part on respective port indices.

10. The method of claim 1, further comprising:
    determining to perform the operation in accordance with an aggregation rule or a separation rule based at least in part on whether the second quantity of antenna ports is larger or smaller than the first quantity of antenna ports.

11. The method of claim 1, further comprising:
    ordering a subset of resources of the set of resources based at least in part on an aggregation order, wherein the operation to obtain the one or more CSI resources from the set of resources is performed after the ordering.

12. The method of claim 11, wherein the aggregation order comprises an ascending order of resource identifiers of the subset of resources.

13. The method of claim 11, wherein the aggregation order comprises a descending order of resource identifiers of the subset of resources.

14. The method of claim 11, wherein the aggregation order comprises an ascending order of a resource list comprising the subset of resources.

15. The method of claim 11, wherein the aggregation order comprises a descending order of a resource list comprising the subset of resources.

16. The method of claim 11, further comprising:
    receiving signaling indicating a set of one or more aggregation orders including the aggregation order.

17. The method of claim 16, further comprising:
    receiving a second control message indicating the aggregation order from the set of one or more aggregation orders.

18. The method of claim 1, wherein the set of resources is associated with the one or more codebook configurations, and wherein performing the operation comprises:
 aggregating two or more resources of the set of resources that have a same slot offset value and a same periodicity based at least in part on the one or more codebook configurations.

19. The method of claim 1, wherein performing the operation comprises:
 aggregating a first resource of the set of resources with a second resource of the set of resources to form an aggregated resource corresponding to the second quantity of antenna ports; and
 labelling each antenna port of the second quantity of antenna ports based at least in part on a total quantity of antenna ports included in the aggregated resource.

20. The method of claim 19, wherein:
 a first set of antenna ports associated with the first resource comprises a first sequence of antenna ports; and
 a second set of antenna ports associated with the second resource comprises a second sequence of antenna ports that follows the first sequence of antenna ports.

21. The method of claim 1, further comprising:
 transmitting, within the CSI report, an indication of the one or more CSI resources based at least in part on performing the operation to obtain the one or more CSI resources from the set of resources.

22. An apparatus for wireless communication at a user equipment (UE), comprising:
 a processor;
 memory coupled with the processor; and
 instructions stored in the memory and executable by the processor to cause the apparatus to:
  receive a control message from a network entity indicating a channel state information (CSI) report configuration, the CSI report configuration indicating a set of resources and one or more codebook configurations;
  perform an operation to obtain one or more CSI resources from the set of resources based at least in part on a difference between a first quantity of antenna ports associated with each resource of the set of resources and a second quantity of antenna ports associated with a codebook configuration of the one or more codebook configurations, wherein, to perform the operation, the UE obtains the one or more CSI resources for measuring CSI on the one or more CSI resources;
  measure the CSI for a set of reference signals received on the one or more CSI resources; and
  transmit a CSI report based at least in part on the measured CSI for the set of reference signals received on the one or more CSI resources.

23. The apparatus of claim 22, wherein the instructions to perform the operation are executable by the processor to cause the apparatus to:
 aggregate two or more resources of the set of resources in accordance with an aggregation rule, wherein the two or more resources are aggregated to form a CSI resource corresponding to the second quantity of antenna ports.

24. The apparatus of claim 23, wherein the instructions to aggregate the two or more resources in accordance with the aggregation rule are executable by the processor to cause the apparatus to:
 aggregate the two or more resources based at least in part on respective indices of the two or more resources.

25. The apparatus of claim 23, wherein the instructions to aggregate the two or more resources in accordance with the aggregation rule are executable by the processor to cause the apparatus to:
 aggregate the two or more resources based at least in part on respective code-division multiplexing group indices associated with each resource of the two or more resources, wherein the two or more resources are aggregated across resource blocks after being aggregated across code-division multiplexing groups of a same resource block.

26. The apparatus of claim 23, wherein the instructions to aggregate the two or more resources in accordance with the aggregation rule are executable by the processor to cause the apparatus to:
 aggregate the two or more resources based at least in part on respective port indices, wherein the two or more resources are aggregated within a code-division multiplexing group and across resource blocks after being aggregated across code-division multiplexing groups of a same resource block.

27. The apparatus of claim 22, wherein the instructions to perform the operation are executable by the processor to cause the apparatus to:
 separate at least one resource of the set of resources into two or more resources in accordance with a separation rule, wherein each resource of the two or more resources forms a respective CSI resource that corresponds to the second quantity of antenna ports.

28. The apparatus of claim 27, wherein the instructions to separate the at least one resource in accordance with the separation rule are executable by the processor to cause the apparatus to:
 separate the at least one resource based at least in part on respective indices of the set of resources.

29. An apparatus for wireless communication at a user equipment (UE), comprising:
 means for receiving a control message from a network entity indicating a channel state information (CSI) report configuration, the CSI report configuration indicating a set of resources and one or more codebook configurations;
 means for performing an operation to obtain one or more CSI resources from the set of resources based at least in part on a difference between a first quantity of antenna ports associated with each resource of the set of resources and a second quantity of antenna ports associated with a codebook configuration of the one or more codebook configurations, wherein performing the operation comprises obtaining the one or more CSI resources for measuring CSI on the one or more CSI resources;
 means for measuring the CSI for a set of reference signals received on the one or more CSI resources; and
 means for transmitting a CSI report based at least in part on the measured CSI for the set of reference signals received on the one or more CSI resources.

30. A non-transitory computer-readable medium storing code for wireless communication at a user equipment (UE), the code comprising instructions executable by a processor to:
 receive a control message from a network entity indicating a channel state information (CSI) report configuration, the CSI report configuration indicating a set of resources and one or more codebook configurations;

perform an operation to obtain one or more CSI resources from the set of resources based at least in part on a difference between a first quantity of antenna ports associated with each resource of the set of resources and a second quantity of antenna ports associated with a codebook configuration of the one or more codebook configurations, wherein performing the operation comprises obtaining the one or more CSI resources for measuring CSI on the one or more CSI resources;

measure the CSI for a set of reference signals received on the one or more CSI resources; and transmit a CSI report based at least in part on the measured CSI for the set of reference signals received on the one or more CSI resources.

* * * * *